United States Patent [19]

Pato

[11] Patent Number: 4,514,306
[45] Date of Patent: Apr. 30, 1985

[54] METHOD OF AND APPARATUS FOR CONTROLLING THE QUANTITY OF FILTER AID FED TO A SEDIMENT FILTER SO AS TO MAINTAIN VIRTUALLY CONSTANT A PRESELECTED OPTIMUM SPECIFIC CAKE RESISTANCE

[75] Inventor: Carlos M. Pato, Staten Island, N.Y.
[73] Assignee: Monarch Wine Co., Inc., Brooklyn, N.Y.
[21] Appl. No.: 594,766
[22] Filed: Mar. 29, 1984

Related U.S. Application Data

[63] Continuation of Ser. No. 449,866, Dec. 15, 1982, abandoned, and a continuation-in-part of Ser. No. 277,890, Jun. 26, 1981, abandoned.

[51] Int. Cl.³ .............................................. B01D 37/02
[52] U.S. Cl. .................................... 210/740; 210/741; 210/778; 210/101
[58] Field of Search ............... 210/739, 741, 778, 101, 210/103, 106, 137, 193, 740

[56] References Cited

U.S. PATENT DOCUMENTS 2,626,728  1/1953  Harper ............................ 210/101 X
4,118,778  10/1978  Strub ............................. 210/193 X
4,151,080  4/1979  Zuckerman ...................... 210/101 X

FOREIGN PATENT DOCUMENTS 717479  10/1954  United Kingdom ................ 210/778

Primary Examiner—John Adee
Attorney, Agent, or Firm—Kirschstein, Kirschstein, Ottinger & Israel

[57] ABSTRACT

A system wherein suspended solids are separated from liquids by passage through a filter after a precoat of filter aid has been deposited on a filter septum. The subsequent addition of filter aid to the liquid and its deposit on the precoat are so regulated that the filter cake produced maintains a practical specific cake resistance to flow therethrough at a preselected value, even if the concentration of suspended solids varies with time, said value being the ratio $\Delta R/\Delta W$, where $\Delta W$ is a small increment of filter aid weight fed and $\Delta R$ is an incremental increase in cake resistance to flow corresponding to that increment $\Delta W$, both increments being on a per unit of filtration area, and the resistance to flow being the differential pressure across the filter cake divided by the flow rate per unit of filtration area.

13 Claims, 13 Drawing Figures

PRACTICAL SPECIFIC CAKE RESISTANCE DETERMINATION

LABORATORY FILTRATION TEST

FILTER AID:     J. M. SUPER CEL
PRESSURE:     CONSTANT AT 50 psi
RATE OF FILTER AID:     $w = 0.022$ lb/gl
SOLIDS LOAD LEVEL     $L = 12$ (RELATIVE VALUE IN ARBITRARY UNITS)

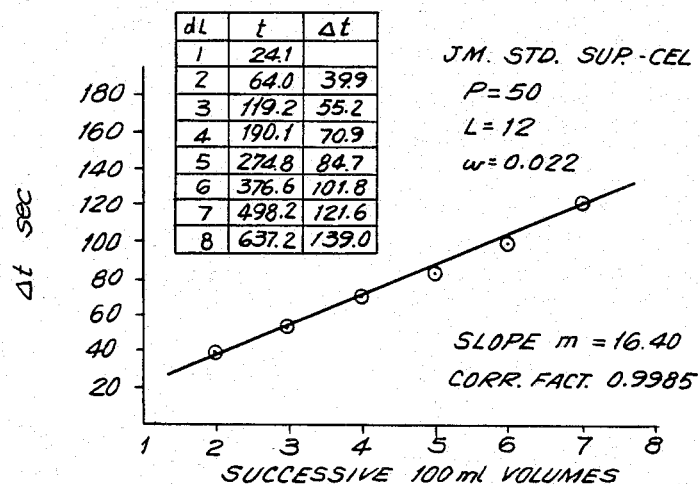

| dL | t | Δt |
|---|---|---|
| 1 | 24.1 | |
| 2 | 64.0 | 39.9 |
| 3 | 119.2 | 55.2 |
| 4 | 190.1 | 70.9 |
| 5 | 274.8 | 84.7 |
| 6 | 376.6 | 101.8 |
| 7 | 498.2 | 121.6 |
| 8 | 637.2 | 139.0 |

J.M. STD. SUP.-CEL
$P = 50$
$L = 12$
$w = 0.022$

SLOPE $m = 16.40$
CORR. FACT. 0.9985

CONVERSION OF THE LABORATORY SLOPE $m$ INTO THE ENGINEERING UNITS SLOPE $K_2$ $$K_2 = 0.0024 \times m = 0.0394$$

PRACTICAL SPECIFIC CAKE RESISTANCE CALCULATION $$r = \frac{dR}{dW} = \frac{P}{w} \times K_2 = \frac{50}{0.022} \times 0.0394 = 89.5$$

LABORATORY UNITS

PRESSURE $(P)$ = psi
VOLUME $(v)$ = dL
AREA $(a)$ = 0.01 ft²
TIME $(t)$ = sec
FILTER AID RATE $(w)$ = lb/gl

ENGINEERING UNITS

PRESSURE $(P)$ = psi
VOLUME $(V)$ = gl
FLOW RATE $(F)$ = gl/MIN/ft²
AREA $(A)$ = ft²
FILTER AID RATE $(w)$ = lb/gl
FILTER AID WEIGHT $(W)$ = lb/ft²
CAKE RESISTANCE $R = \frac{P}{F}$

FIG. 1

PRACTICAL SPECIFIC CAKE RESISTANCE r AS A FUNCTION OF SOLID LOAD LEVEL L AND FILTER AID RATE w

J.M. STANDARD SUPER CEL

| $w \times 10^2$ | $L$ | $P$ | $m$ | $K_2 \times 10^2$ | $r^{(1)}$ |
|---|---|---|---|---|---|
| 2.2 | 0.0 | 50 | 2.70 | 0.65 | 14.8 |
| 2.2 | 1.0 | 50 | 3.94 | 0.95 | 21.6 |
| 2.2 | 2.0 | 50 | 4.60 | 1.10 | 25.0 |
| 2.2 | 4.0 | 50 | 6.05 | 1.45 | 33.0 |
| 2.2 | 8.0 | 50 | 11.60 | 2.78 | 63.3 |
| 2.2 | 12.0 | 50 | 16.40 | 3.94 | 89.5 |
| 2.2 | 16.0 | 50 | 25.30 | 6.07 | 138.0 |
| 2.2 | 24.0 | 50 | 47.60 | 11.40 | 259.6 |
| 2.2 | 30.0 | 50 | 67.50 | 16.20 | 368.2 |

(1) FOR SYMBOLS AND UNITS SEE FIG 1.

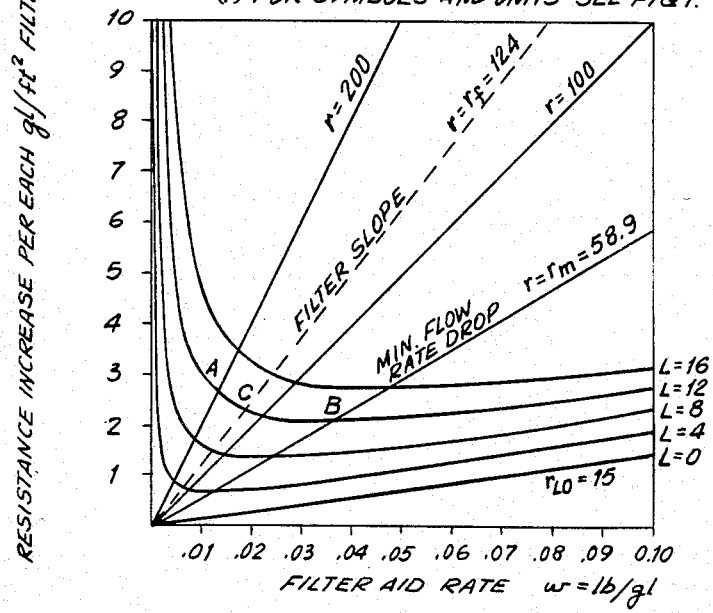

$rw = 15 w + 8.5 L \times 10^{-2} + 1.3 \frac{L^2}{w} \times 10^{-4}$ (VISCOSITY = 2 CENTIPOISES)

A – UNDERFEEDING; TOTAL VOLUME THROUGHPUT = $\frac{\Delta R}{rw} = \frac{310}{3} = 103.3$ g$l$/ft$^2$ B – OVERFEEDING; TOTAL VOLUME THROUGHPUT = $\frac{\overline{\Delta W}}{w} = \frac{2.5}{0.0355} = 70.4$ g$l$/ft$^2$ C – BALANCED FEED; TOTAL VOLUME THROUGHPUT = $\frac{\Delta R}{rw} = \frac{\overline{\Delta W}}{w} = \frac{310}{2.305} = \frac{2.5}{0.0186} = 135$ g$l$/ft$^2$

EXAMPLE OF AN AVERAGE POROSITY FILTER AID GRADE (LOW VISCOSITY)

$r_f > 4 r_{L0}$ → $r_f$ BETTER FILTRATION SLOPE THAN $r_m$

FIG. 2

$rw = 37.5 + 16.25\ L \times 10^{-2} + 4.25\ \dfrac{L^2}{w} \times 10^{-4}$ (VISCOSITY = 5 CENTIPOISES)

EXAMPLE OF AN AVERAGE POROSITY
FILTER AID GRADE BUT AT HIGH VISCOSITY $r_f < 4\, r_{Lo} \rightarrow r_m$ BETTER FILTRATION SLOPE THAN $r_f$ BLOCK DIAGRAM OF A CIRCUIT TO CONVERT A LINEAR
RAMP GENERATOR INTO A LOGARITHMIC RAMP
GENERATOR FOR FILTERS WITH CYLINDRICAL
FILTRATION AREAS.

$$\phi(W_T) = k_1 k_2 \bar{\gamma} \, LOG \, (W_T + k_2 V_0) - k_1 k_2 \bar{\gamma} \, LOG \, k_2 V_0$$

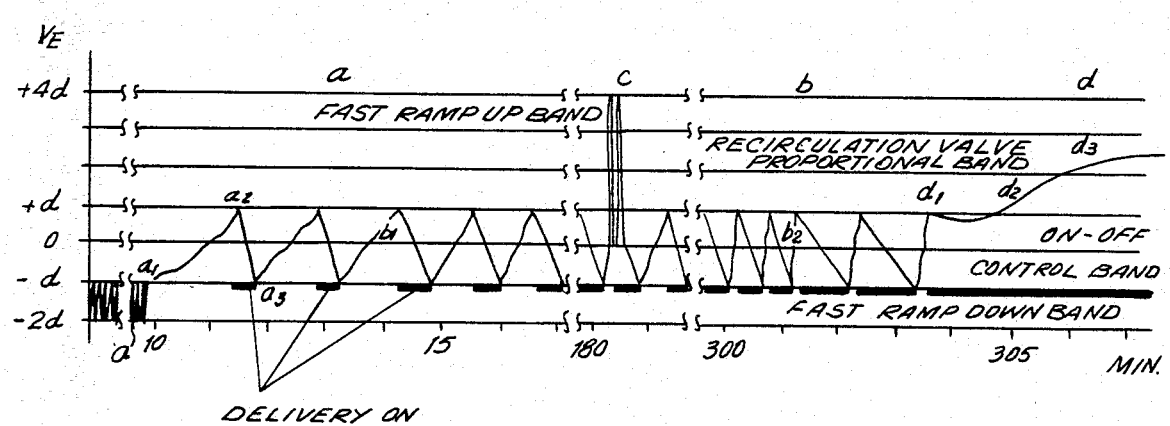

GRAPHIC REPRESENTATION OF THE ERROR VOLTAGE $V_E \sim (V_R - V_W)$ PLOTTED AGAINST FILTRATION TIME. THE FOUR DIFFERENT FUNCTIONS OF THE AUTOMATIC SYSTEM ARE ILLUSTRATED: EQUALIZER RAMP UP AND RAMP DOWN BANDS THAT HANDLE SUDDEN CHANGES IN $V_R$ DUE TO REASONS OTHER THAN THE NORMAL SEDIMENT ENTRAPMENT; THE ON-OFF BAND, CONTROLLING CAKE SPECIFIC RESISTANCE UP TO A MAXIMUM LIMIT OF SOLIDS LOAD IN THE IN-FEED; RECIRCULATION VALVE PROPORTIONAL BAND THAT EXTENDS THE CONCENTRATION RANGE BEYOND THAT LIMIT, BY REDUCING THE QUANTITY OF INCOMING SOLIDS THAT CONFORM WITH THE MAXIMUM RATE OF FILTER AID DELIVERY.

FIG. 10

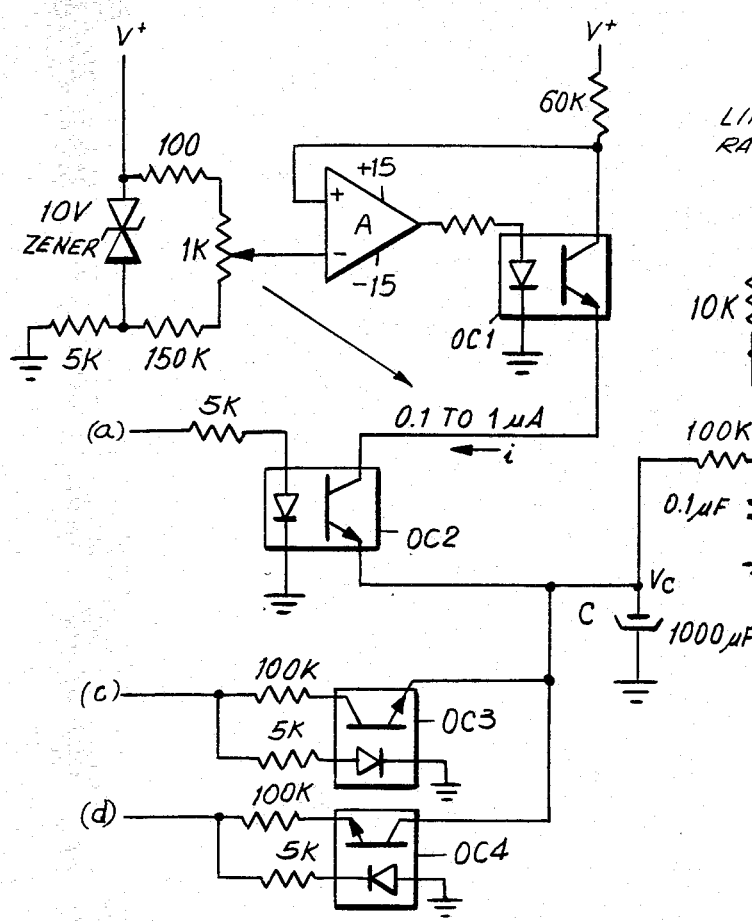
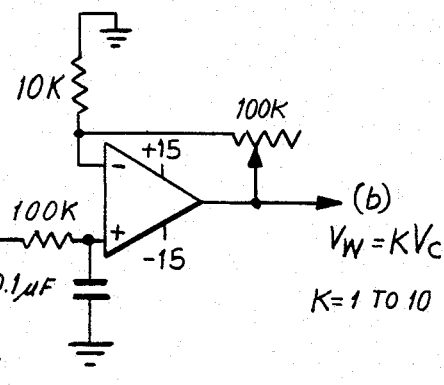
FIG. 11
LINEAR VOLTAGE RAMP GENERATOR
$V_W = K V_C$
$K = 1$ TO $10$
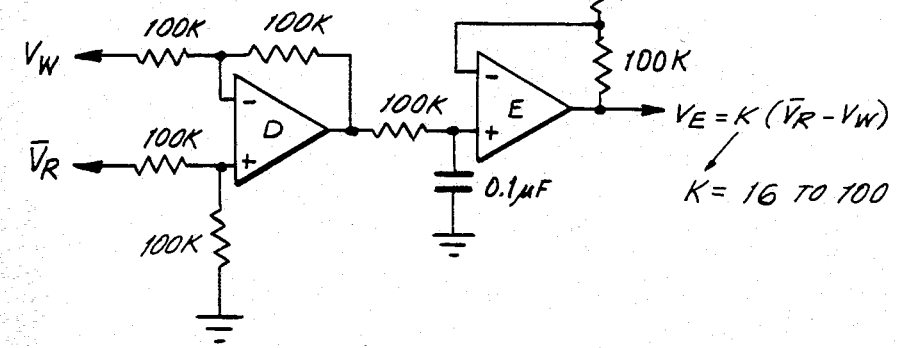
FIG. 12
ERROR CALCULATOR AND AMPLIFIER
$V_E = K(\bar{V}_R - V_W)$
$K = 16$ TO $100$

METHOD OF AND APPARATUS FOR CONTROLLING THE QUANTITY OF FILTER AID FED TO A SEDIMENT FILTER SO AS TO MAINTAIN VIRTUALLY CONSTANT A PRESELECTED OPTIMUM SPECIFIC CAKE RESISTANCE

CROSS-REFERENCE TO RELATED APPLICATION

This application is a continuation of application Ser. No. 449,866, filed Dec. 15, 1982 and a continuation-in-part of copending application Ser. No. 277,890, filed June 26, 1981 for METHOD OF AND APPARATUS FOR CONTROLLING THE QUANTITY OF FILTER-AID FED TO A SEDIMENT FILTER AS A FUNCTION OF INCREMENTAL CHANGE OF SPECIFIC FILTER RESISTANCE, both abandoned.

BACKGROUND OF THE INVENTION

1. Field of the Invention

A system for maintaining the specific cake resistance substantially constant by controlling the quantity of filter aid fed to a sediment filter.

2. Introduction

The separation of solids from liquids is one of the most widely used operations in industrial processes. The material recovered after separation either may be the liquid or the solids, depending on the desired end product. Filtration is one of the most commonly used methods to achieve this separation. One type of filtration frequently referred to as cake filtration, uses filter aid, being a two-stage operation. In the first, a thin layer of filter aid, e.g. a fine, liquid-insoluble powder such as diatomaceous earth, commonly known as a "precoat", is built up on a filter septum by adding to a clear liquid circulating through the filter system an adequate quantity of filter aid (usually 0.1 to 0.2 lbs/ft$^2$ of septum). After precoating, small amounts of filter aid (body feed) are regularly added to the liquid to be filtered. As filtration progresses, the suspended solids from the unfiltered liquid are retained in the filter by entrapment in the porous structure of the cake formed by the body feed particles. In the absence of body feed the impervious solids carried by the liquid would rapidly slime over the filtration surface and flow rates soon would drop to unacceptably low levels. The regular addition of body feed, by providing a continuously renewed filtration surface, results in a dramatic increase of filtration efficiency. The effect of the rate of body feed, for a certain level of sediment solids in the unfiltered liquid, is as follows: Too slow a rate of addition reduces the total throughput since the body feed particles, being completely surrounded by the impervious solids fail to increase the permeability of the filter cake formed. The thickness of the filter cake increases slightly, without improvement in its porosity. After a certain point, however, the solid particles will not fill all the voids and pores in the filter cake and the porosity of the cake will improve with consequent increase in total attainable throughput. From this point on, as the fraction of pores available for liquid flow increases, the throughput will continue to increase. First steadily for awhile, but then tapering off. It reaches a peak after which it will start to decrease slowly. This happens when the improvement in permeability does not compensate for the increase in resistance produced by the additional body feed. It would seem, at first glance, that the rate of body feed corresponding to the mentioned peak should be the ideal for conducting in particular filtration. This is usually not so, however, since it corresponds to a condition of clear overfeeding (at least for filtration of liquids with a viscosity similar to water, like wine, beer, etc. and for the degree of porosity of the filter aid grades most commonly used).

The concept of the optimum rate of body feed is better understood by close analysis of the two extreme filtration conditions: underfeeding and overfeeding. The first, resulting from too slow a rate of addition of filter aid, leads to a very rapid increase of the cake resistance. The filtration cycle will be shortened due to the rapid flow rate drop. Increasing the pressure is seldom possible because the pressure in the filter cannot be raised above a certain safety limit. The second condition, resulting from too rapid a rate of addition of filter aid, will also reduce the maximum attainable throughput per cycle due to a rapid increase in the cake thickness. This necessitates premature interruption of the filtration when the filter space limitation for cake buildup is reached resulting in the danger of cake bridging, and possibility of equipment damage.

Since, in an extreme situation of the first condition, a rapid "clogging" of the precoat surface may result, the tendency usually is to overfeed. The filtration is usually started with an over-generous rate of body feed followed by tentative and empirical adjustments as the filtration progresses. The rate of pressure increase and/or flow rate drop across the filter are the measurements that help the operator in deciding whether adjustments are needed. Observation of the unfiltered liquid turbidity is another clue as to the concentration of sediment solids and may forewarn the operator as to the need for body feed changes.

The known systems that attempt to automate part of the manual operations associated with the rate of body feed consist mostly in the utilization of solids/liquid proportioning devices whose object is to keep constant the chosen rate of filter aid feed regardless of flow rate variation. Since these systems cannot otherwise react to changes of solids concentration in the unfiltered liquid, further controls are frequently used consisting of the utilization of turbidity instruments in the in-feed line. A signal from the turbidity measurement is used to automatically adjust the proportioning factor in response to solids concentration changes. To compensate for color interference, a second turbidity measurement in the filtered liquid line is usually performed.

The difficulties associated with these systems arise from two main problems. The first one is a consequence of the poor relationship between turbidity and solids concentration. The second and most troublesome results from the often poor correlation between solids concentration and filter aid body feed requirements. This is so because the physical properties of the solids are usually of greater importance than its mere concentration.

3. Purposes of the Invention

It is an object of the present invention to provide a system that has an efficient automatic control of filter aid feed rate, thus circumventing the above mentioned prior art drawbacks.

Another object of the invention is to provide a filtration cake with physical characteristics that can be measured during the process and that directly relate to filtration efficiency, namely a "practical specific cake resistance".

Still another object of the invention is to provide methods to determine the practical specific cake resistance value that best approaches the most efficient filtration conditions.

It is a further object of the invention to provide a new system that automatically will maintain the aforesaid preselected most desirable specific cake resistance.

4. Description of the Prior Art

One of the recent inventions that attempts to solve some of the previously described difficulties is disclosed in U.S. Pat. No. 4,118,778 (STRUB), granted Oct. 3, 1978. To derive the control signal for filter aid feed adjustment, the STRUB system utilizes measurements of variables more closely related to filtration conditions, namely flow rate and differential pressure across the cake. Inasmuch as these variables are a direct effect not only of the solids concentration, but also of the physical properties of the solids, this is an improvement over the described prior art. Unfortunately, the system fails to achieve the full advantage that should be expected from that improvement due to the manner in which the control signal is derived from the measured variables. Since in some aspects the STRUB system may superficially resemble the instant invention, it will now be discussed in more detail.

The object of the STRUB invention is to obtain a "substantially even loosening up" of the sediment over the entire cake. The inventor proposes to achieve this by making the quantity of filter aid delivered per unit of time dependent on a control signal $J_3$. The value $J_3$ is generated from the variable q which is the flow rate through the cake and p which is the differential pressure across the cake, in two different proposed ways, namely:

$$J_3 \sim P/Q \text{ with } Q = \int q \, dt \quad (1)$$

In this first alternative, it is evident that the rate of filter aid feed ($\sim J_3$) for the incoming liquid is made dependent on information P/Q only (and entirely) derived from filtration conditions resulting from the liquid already filtered. This is past history and, therefore, useless to adequately handle solids load variations in the liquid input to the filter cake. Therefore, in order for this system to assure an "even degree of loosening", it would be necessary that the concentration of sediment in the in-feed liquid remain constant, an ideal condition not usually present in actual practice. This is a tremendous limitation and excludes one of the principal objectives of applicant's invention, viz, the handling of sudden changes in the quantity of incoming sediment.

Another limitation of the STRUB invention is that, in the above expressions, q must necessarily represent not only the flow rate across the cake, but also the flow rate of the infeed liquid (q must not only carry the information relating to the differential pressure developed across the cake but also the one pertaining to the total volume of liquid carrying the sediment solids). In applicant's system, these two flows do not have to be necessarily the same and in some conditions, they are required to be different. (see the function of the automatic circulation valve in applicant's system as described hereinafter).

$$J_3 \sim \frac{d\left(\frac{p}{q}\right)}{dt} \quad (2)$$

Intuitively, it seems correct to expect an "even degree of loosening" if the rate of filter aid feed per unit of time is made proportional to the rate of cake resistance increase, per unit of time. However, what seems to be feasible runs into unsurmountable problems in practice; these result from the difficulty of performing a prompt and adequate determination of the value $$\frac{d\left(\frac{p}{q}\right)}{dt}$$

from the inherently excessive noisy measurement of the cake resistance. STRUB acknowledges these difficulties (STRUB Patent, Col. 12, lines 16-43) and tries to overcome them by eliminating the random noise from the resistance value by integration during successive time intervals varying from one minute at the beginning of filtration to two minutes toward the end. The time derivative value is then calculated by dividing the two last successive integrated values by the average time interval. This is done in digital form and the result is then converted into an analog signal.

This second method suffers from a grave shortcoming. The need to use integration times of the order of one to two minutes results in a slow response of the control system and consequent inadequate response to sudden changes in solids load. On the other hand, for liquids of low solids concentration, integration times of even two minutes will be too short. This results in the integration being meaningless due to the very slow rate of resistance increase.

This explains why STRUB admits that extensive experimental investigations failed to reveal that this second method has any real advantage over that first described (STRUB Patent, Col. 8, lines 50-60).

From the above considerations, it will be seen that applicant's invention presents, in relation to STRUB's, the following clear and innovative improvements:

1. Applicant's control system is designed so as to produce a filter aid cake with a constant, preselected "effective" specific resistance. This relates to a filter aid cake physical property that is defined and claimed in clear and practical terms in order to make its measurement, during filtration, easy and accurate. This contrasts with STRUB's vaguely stated aim of obtaining an undefined "substantial even loosening up of sediment" through the entire cake (STRUB Patent Col. 9, lines 44-46).

2. Applicant describes a method of determining what value to select for the specific resistance so as to achieve the best balanced feeding (maximum volume output per cycle). It is obtained by calculation and is expressed by a numerical value. In the STRUB system, the "degree of loosening up" is dependent on the proportionality factor between the control variable (output of calculator unit 6, STRUB FIG. 1) and the quantity of filter aid feed per unit of time. What that factor should be, in numerical terms, is never stated. As a matter of fact, STRUB's claims 25, 26 and 27 are admissions that his system is incapable of assuring an "even loosening up"

since they call for a "rigidly predetermined quantity of filter aid per unit of time" to be fed at beginning of filtration, and suggested that the value should correspond to the middle range between the minimum and the maximum rates of filter aid dosage (STRUB Patent, Col. 39, lines 35-59). Also, the same admission is evident in the suggested method of how and when to adjust the proportionality factor, during filtration (STRUB Patent, Col. 36, lines 2-8).

3. In applicant's system, the specific cake resistance is determined and controlled in a direct way, without any need for integration time intervals. This eliminates the response delay intrinsic in STRUB's system which is the main reason for the shortcomings of his system. In fact, the perception that the ratio between the rate of increase of resistance per unit of time to the rate of filter aid per unit of time determines the degree of loosening up is correct, but only if both time bases coincide.

4. The handling of hydraulic distrubances, other than random noise, through an "equalizer" control functions is a feature of great convenience in the presently disclosed filtration control system not provided by STRUB's system.

5. An automatic circulation valve is another feature dramatically extending the range of sediment solids concentrations possible to be handled by applicant's system. This is also not available in STRUB's system.

SUMMARY OF THE INVENTION

To achieve the stated objects of the present invention, a physical filter cake characteristic is defined. It is referred to as the "practical specific cake resistance" and is easily monitored during filtration. Differential pressure and flow rate across the cake are measured and cake resistance calculated on a per unit of filtration area basis. The rate of filter aid addition is controlled through a feedback loop so as to keep a constant ratio between the resistance measurement and the controlled per unit of area filter aid weight. In this manner, a homogeneous cake is formed that has, through all its thickness beyond the precoat, a constant "practical specific cake resistance." The present system automatically assures that the filtration will take place at its point of maximum efficiency provided that the appropriate value of specific resistance is selected. Innovative methods of how to determine that optimum value are disclosed below.

BRIEF DESCRIPTION OF THE INVENTION

The present approach to filter aid body feed control was an outgrowth of the theoretical study of cake filtration which the inventor conducted in the laboratories of MONARCH WINE CO., INC. Certain concepts developed from those studies are esential to better understand the invention and its implications. The first concept, already mentioned, is the "practical specific cake resistance". This cake physical characteristic is represented in incremental form by the ratio $(\Delta R)/(\Delta W)$, where:

$\Delta W$ is an incremental weight of filter aid deposited per unit of filtration area to form a very small incremental layer of cake, $\Delta R$ is the increase in resistance produced by the above layer expressed also on a per unit of filtration area.

This value $\Delta R$ can be very small if constituted only by porous filter aid particles, or extremely high if all the pores were totally filled up with impervious sediment particles.

In differential form, the foregoing value is represented by $dR/dW$ and is the limit of the ratio $(\Delta R)/(\Delta W)$ when $\Delta W$ approaches zero.

In the above definition, the work "practical" is used to reflect the important and necessary departure from classical filtration theory where specific resistance refers to the unit weight of dry solids at standard viscosity equal to 1 centipoise. The "practical" definition, by relating the specific resistance to the unit weight of filter aid in the cake (easily measured during filtration), allows its practical application where the classical definition would have been impossible to use.

Another important concept relates to the measurement of the effect of the presence of sediment solids on filter aid cake characteristics. Rather than follow the classic approach that tries to relate physical and chemical characteristics of the sediment solids (like particles dimensions, concentration, colloidal nature, etc.) I found it useful to characterize the liquids to be filtered as having a certain "solids load" value. This is a measurement of the effect of sediment solids in modifying the practical specific resistance of filter aid cake and is represented by the letter L. For a perfectly clear liquid the "solids load" value is, obviously, zero ($L=0$). It will produce a cake with the characteristic specific resistance of the particular grade of filter aid used. The value $L=1$ was arbitrarily attributed to the load corresponding to one liter of filtered wine to which one milliliter of a given wine lees slurry had been added. A liquid containing exactly ten times the amount of the same solids as $L=1$ will have a solids load value of ten ($L=10$). However, if filtered with ten times the amount of the same filter and used with $L=1$, it will produce a cake with exactly the same specific resistance. This is so because the proportion of solids load to filter aid weight will have been kept exactly the same. A cake slice produced by the filtration of a certain volume of the first case will be exactly the same as an identical slice of the second case, although it would take the filtration of one tenth the volume to produce it.

It would be impossible, however, to predict what specific cake resistance would result if a $L=10$ liquid infeed was filtered with the same amount of filter aid. The value $L=n$ was artibtrarily attributed to the load corresponding to one liter of clear liquid to which n milliliters of a given solids slurry was added. Laboratory results confirmed that the specific cake resistance is a function of the solids/filter aid ratio and will not change if this ratio is kept constant.

The purpose of the laboratory work was to establish a mathematical relationship between solids load, rate of body feed and specific cake resistance. Since the results obtained and equations derived are very useful for achieving the most benefit from the present invention, a brief description of the work follows:

To study the previously mentioned relationship, I collected data from carefully controlled laboratory filtrations. For the preparation of the liquid samples a clean, prefiltered wine was mixed with a solids slurry of ordinary wine lees. This slurry contained solids settling to about 37% of the volume and consisted mainly of yeast cells, gelatine, bentonite, etc.

One liter samples of this liquid were prepared containing increasing quantities of the slurry (0,2,4,8,12,16 ml) to simulate different solids levels and then filtered through a precoated laboratory filter (with a fixed one hundredth square foot area) under constant pressure and temperature conditions. The solids to filter aid ratios were varied and the solids kept uniformly suspended. It was observed that the time required to filter each successive one hundred milliliters increased as a straight line function of the number of volumes filtered (see FIG. 1). The slope m of this line in convenient laboratory units was determined by linear regression, with a correlation factor usually better than 0.997. The value $K_2$ is the result of the conversion of m to conventional engineering units; it represents the slope that would have been obtained if the filtration area had been 1 ft$^2$, volume increments of 1 gal. timed in minutes and at a constant pressure of 50 psi.

From this value $K_2$ it is possible to calculate the specific cake resistance dR/dw which, since it is kept constant, I will represent by r.

Since $K_2$ is the second derivative of time in relation to volume, I can write:

$$\frac{d_2 t}{dV^2} = K_2 \quad (1)$$

and since:

$$F = \frac{dV}{dt} \text{ and therefore } \frac{dt}{dV} = \frac{1}{F} \quad (2)$$

I have, from (1) and (2):

$$\frac{d_2 t}{dV^2} = \frac{d}{dV} \cdot \left(\frac{1}{F}\right) = K_2 \quad (3)$$

By definition:

$$R = \frac{P}{F} \text{ and therefore } \frac{1}{F} = \frac{R}{P}$$

thus I can write:

$$K_2 = \frac{d}{dV} \cdot \left(\frac{R}{P}\right) \quad (4)$$

Since in the laboratory test filtrations, the rate of filter aid feed rate w was kept constant as was the practical specific cake resistance which I will represent by r, I have:

$$R = rW = rwV \quad (5)$$

and, from (4) and (5):

$$K_2 = \frac{d}{dV}\left(\frac{rw}{P} \cdot V\right) = r\frac{w}{P}$$

and finally:

$$r = \frac{P}{w} \cdot K_2 \quad (6)$$

From the data accummulated, a mathematical model equation was derived which expresses, with enough accuracy, the relationship between practical specific resistance r, solids loading value L and filter aid feed rate w. It is of the form:

$$r = A + B\left(\frac{L}{w}\right) + C\left(\frac{L}{w}\right)^2 \quad (7)$$

This equation further confirms that the specific cake resistance is a function of the solids to filter aid ratio. In this equation A is a coefficient that depends only on the particular grade of filter aid tested; it is the characteristic filter aid specific resistance since it is equal to r when L=o. It will also be referred to as $r_{Lo}$. The coeficients B and C are mainly dependent on the filter aid grade but also on the physical properties of the sediment solids.

For equation (7) to apply with maximum accuracy, the grade of filter aid should be conveniently selected in accordance with the physical characteristics of the solid particles to be removed. It is desirable to procure a total entrapment of the sediment solids, that is, no migration of fine particles, into the cake layers already settled, should occur. This, however, is really not a limitation but a requisite for good filtration.

Another useful configuration of equation (7) results by multiplying both terms by w. This yields $$rw = Aw + BL + C \cdot \frac{L^2}{w} \quad (8)$$

Since w is the weight of filter aid per unit of liquid volume the term rw represents the increase in resistance per each unit of volume filtered. For a given value of solids loading L, therefore, the minimun flow rate drop is achieved for a filter aid feed rate w such that rw is minimum.

From eq. (8) it can be shown[1] that rw will be minimum when w has a value $w_m$ such that:

$$w_m = \sqrt{\frac{C}{A}} \cdot L \quad (9)$$

[1] By finding the w value for which the first derivative of equation (8) is zero.

The importance of equation (9) is obvious since it permits, for a given grade of filter aid and for a certain solids level, to determine the feed rate $w_m$ that will produce the minimum flow rate drop. But a much more pertinent expression, regarding the present invention, is the one derived by solving equation (7) for the particular value $w_m$ from equation (9), $$r_m = 2A + \frac{B}{\sqrt{\frac{C}{A}}} \quad (10)$$

This expression shows that, for each given grade of filter aid, there is a particular specific cake resistance corresponding to the minimum flow rate drop. Moreover, it shows also that the value $r_m$ is completely independent of the solids load level. While the present system it is possible to pre-select this value $r_m$ and keep it constant, all through filtration, regardless of variations in the sediment solids level. It would be possible, therefore, to assure at all times the minimum flow rate drop, if so desired. It will be seen, however, that frequently this is not an economic filtration point since it may be rather wasteful of filter aid. From equations (7) and (8) it will be seen that substantial reduction of filter aid (from the value $w_m$) can be achieved with minimal sacrifice in flow rates. It will be easier to illustrate this and other points by using examples and actual numerical values. Before doing this, however, it is convenient to introduce at this point, a new concept. It relates to an important value of specific resistance derived from a different type of considerations and to which I will refer as the "filter slope".

Filter slope is, usually, the specific resistance value most desirable for conducting the filtration, on a particular filter installation, since it most often will provide the best balance between the overfeeding and underfeeding conditions. As mentioned before, either of these conditions result in shortening a filtration cycle; the filter would have to be prematurely opened, cleaned and reset with the consequent cost increase due to the unnecessary labor and down time. Overfeeding results in reaching too early the maximum weight of filter aid which the filter can accommodate; in underfeeding the cycle will have to be stopped because of prematurely reaching the maximum resistance value commensurate with puming capabilities for adequate flow rate. The best balance between these two conditions is achieved when the feed of filter aid is so regulated as to produce a controlled specific cake resistance whereby the maximum filter resistance and the cake capacity constraints are reached simultaneously.

Since the maximum filter cake resistance and the maximum filter aid weight allowed in a particular filter can both be expressed on a per square foot basis, it is evident they will define a practical specific cake resistance which I chose to call the "filter slope". It is arrived at pursuant to the present invention, by ascertaining two main values, which are:

(1) the difference $\overline{\Delta R}$ equal to $R_u - R_i$; where $R_u$ is the ultimate resistance to flow, that is, the highest resistance value beyond which pressure safety considerations and/or reduced flow rate would make it necessary to advisable to terminate the filter cycle; $R_i$ is the initial low resistance to flow and depends on the precoat resistance and system hydraulics such as inlet and outlet piping and fittings; delivery pump characteristics, etc.

(2) the maximum quantity of filter aid allowable $\overline{\Delta W}$; this is the total weight of filter aid which, together with the solids in the liquid, can be added during a filtration cycle; it depends upon physical space limitations in the filter chamber for cake buildup. It should be noted, that contrary to what might be expected, the same weight of filter aid will form a smaller volume of cake with greater concentration of solids retained. This is so because of increased compressive drag in the filter aid particles.

By way of illustration, pertinent data for a plant filtration system is shown in a typical example in which the plant filter system parameters for a typical plant area are as follows:

| Plant filter system parameters | | |
|---|---|---|
| | | Per sq. ft. |
| Filt. area (A) | 200 ft.$^2$ | 1 |
| D.E. capacity (W) | 500 Lbs. | 2.5 lbs/ft$^2$ |
| Init. diff. pressure (P$_i$) | 7 psi | 7 psi |
| Init. liquid flow rate (F$_i$) | 140 gpm | 0.7 gpm/ft$^2$ |
| Ult. diff. pressure (P$_u$) | 80 psi | 80 psi |
| Ult. liquid flow rate (F$_u$) | 50 gpm | 0.25 gpm/ft$^2$ |

From the above data, the average cake resistance ($\overline{\Delta R}/\overline{\Delta W}$) is calculated as follows:

| Filter Slope Calculation | |
|---|---|
| Init. system resist. | $R_i = P_i/F_i = 7/0.7 = 10$ |
| Ult. system Resist. | $R_u = P_u/F_u = 80/0.25 = 320$ |
| Totl. incr. in cake resist. | $\overline{\Delta R} = R_u - R_i = 310$ |
| Av. specif. resist.$^a$ | $\dfrac{\overline{\Delta R}}{\overline{\Delta W}} = \dfrac{310}{2.5} = 124$ |
| Filter slope$^a$ | $r_f = \dfrac{dR}{dW} = \dfrac{\overline{\Delta R}}{\overline{\Delta W}} = 124$ |

$^a$ $\overline{\Delta W}$ is the maximum amount of filter aid permissable on a per foot basis Since in the automatic control system subsequently illustrated and detailed in the description of the invention, the specific cake resistance dR/dW is held constant I will designate it by r. For the particular case of filter slope I will represent it by $r_f$. It will be seen that the value $r_f = 124$ will be, for the particular filter installation described, the filtration slope that will most frequently be the best balance between overfeeding and underfeeding conditions. However, for particular cases where grades of filter aid with very low porosities are used (and or for conditions of high viscosity) the previously described specific cake resistance $r_m$, corresponding to the minimum flow rate drop, will define a more efficient filtration slope; an identical or greater volume throughput per filtration cycle will be achieved with some economy in filter aid.

The following numerical examples and a convenient graphic representation of cake filtration conditions will make this point clearer.

Examples to illustrate the relationships between practical specific cake resistance, sediment solids load, filter aid grade and other filtration parameters.

The following engineering units and respective symbols will be used:

P—differential pressure across the cake in pounds per square inch (psi)

F—flow rate in gallons per minute per square foot (gpm/ft$^2$)

W—weight of filter aid in the cake, in pounds per square foot of filter (lbs/ft$^2$)

w—filter aid dosage in pounds per gallon (lbs/gal)

R—cake resistance (R=P/F)

r—practical specific cake resistance (r=(dr)/(dW))

L—"solids load" relative value in arbitrary units; in the following examples it represents the solids contained in L milliliters of a specified wine lees slurry added to one liter of filtered wine.

Subscript m=minimum

The results of the laboratory tests performed using a grade of diatomaceous earth of an average degree of porosity and designated by the supplier as J. M. Standard Super Cel are tabulated in FIG. 2. The model equation found to fit these results closely is:

$$r = 15 + 0.085 \frac{L}{w} + 0.00013 \left(\frac{L}{w}\right)^2 \quad (11)$$

corresponding to equation (7) where A=15, B=0.085 and C=0.00013

(11) can be rearranged and will become:

$$rw = 15w + 0.085 L + 0.00013 \frac{L^2}{w} \quad (12)$$

In equation (12) the value of rw will be minimum, for any given value of L, when [from (9)]:

$$w = w_m = \sqrt{\frac{0.00013}{15}} \cdot L = 0.00294 L$$

But more important, equation (11), when solved for $w_m$ will give a value for r that I will designate by $r_m$, such that [from (10)]:

$$r_m = 2 \times 15 + \frac{0.085}{0.00294} = 58.9$$

This indicates that[1], regardless of the value of solids load L, the minimum resistance increase per each gallon per square foot filtered $(rw)_m$ always will be obtained, for that particular filter aid, with a cake specific resistance of approximately 59.

[1] *It also indicates that for the calculation of $r_m$ the units in which L is expressed are arbitrary. They only have to indicate relative solids load values.*

As can be noted, however, from the following tables, a substantial reduction in filter aid is possible, without substantial resistance increase.

| L = 2 | | | |
|---|---|---|---|
| p | p × $w_m$ | r | rw |
| 1.2 | 0.0071 | 49 | 0.349 |
| 1.0 | 0.0059 | 59* | 0.346** |
| 0.9 | 0.0053 | 66 | 0.347 |
| 0.8 | 0.0047 | 75 | 0.351 |
| 0.7 | 0.0041 | 87 | 0.358 |
| 0.6 | 0.0035 | 105 | 0.370 |

| L = 16 | | | |
|---|---|---|---|
| P | p × $w_m$ | r | rw |
| 1.2 | 0.0565 | 49 | 2.79 |
| 1.0 | 0.0471 | 59* | 2.77** |
| 0.9 | 0.0424 | 66 | 2.78 |
| 0.8 | 0.0377 | 75 | 2.81 |
| 0.7 | 0.0330 | 87 | 2.86 |
| 0.6 | 0.0283 | 105 | 2.96 |

*$r_m$ value, corresponding to the:
**minimum rw

The foregoing tables show that a forty percent savings in filter aid is possible (p32 0.6) with less than seven percent sacrifice in flow rate drop resulting from the rw resistance increase. It also should be noticed that the same specific cake resistance corresponds to the same trade off between filter aid savings and flow rate drop, regardless of such disparate solids load levels. A twenty percent reduction in filter aid (p=0.8), for example, will produce an increase in resistance of just over one percent; for either solids level the corresponding specific resistance r will be eighty seven. The second solids level being eight times higher it will require eight times the amount of filter aid and will produce a resistance increase, per gallon per square foot filtered, eight times greater; the practical specific cake resistance, however, will be the same. This is clear evidence of the manifest suitability of the practical specific cake resistance measurement for the proper control of filter aid feed rate.

A graphic illustration of this phenomenon is also presented in FIG. 2. It represents a family of curves, for J. M. Standard Super Cel, corresponding to different values of solids level. In the system of coordinates used, rw is the ordinate and w the abscissa. High values of ordinate correspond, therefore, to short filtering cycles due to rapid flow drop. The same is true (short cycles) for high values of abscissa in consequence of the cake capacity limitation.

Straight lines passing through the origin are points of common specific resistance r and consequently possible operating slopes.

The slope of 124 is shown and also the 100 and 200 slopes as references. The proper "balanced" filtration, for a certain solids level, is most frequently achieved at the point where the respective L curve intercepts the filter slope line $r=r_f=124$. Points to the left along the load line, correspond to increasing underfeeding conditions resulting in reduced total throughput determined by the ultimate flow rate constraint. To the right, a reduction of total attainable throughput will identically occur as a consequence of the cake capacity limitation being reached sooner.

The family of curves illustrate how the cake resistance changes for different rates of filter aid feed w at various levels of solids loading L. The line $L_o$, corresponding to the solids free liquid, is a straight line passing through the origin, as should be expected (rw=15 w from eq. 12, since L=o). In the complete absence of other solids, the specific resistance of the cake will depend only on the grade of filter aid added. (The permeability indicated as typical, by the filter aid supplier, for this grade is 0.5 Darcys. This porosity should have resulted in a slope for Lo, for the viscosity conditions of 2 centipoises, of about seven. The value $r_{Lo}=15$ found is indicative of the reasons why the permeability data is presented by the supplier with the warning that the values are to be considered as typical and not as rigid specifications.)

As the solids level increases the "loading lines" take the shape illustrated in the graph. One can see that for high values of filter aid the curves are asymptotic to lines parallel to $L_o$ (rw=aw+bL) at a distance (bL) from $L_o$ that is a function of the solids loading value. As the filter aid feed is decreased the lines descend, pass through a minimum and then climb sharply becoming almost vertical as w approaches zero. This reflects the fact that, in the absence of filter aid, the solids would soon blind the surface of the cake making it practically impenetrable. As previously shown, mathematically, the "minimums" of the whole family of load lines reside in a slope line that, for T. M. Standard Super-cel has a $r_m=58.9$. That the load lines cross the filter slope line at an angle close to the horizontal has the practical implication of showing that it would be a mistake to make changes in the direction of overfeeding. If any advantage could be obtained, it would be in the direction of underfeeding since some filter aid could be saved with a small sacrifice in total throughput. Points A,B and C correspond to filtrations, at three different slopes, of a wine with a solids level equivalent to L 12.

Point A represents an underfeeding condition; the total volume throughput will be limited by the maximum resistance limitation. For the hypothetical filter previously described, the total volume can be calculated by dividing the total resistance increase allowed by the rw value corresponding to point A; therefore one will have 310:3.0=103 gl/ft². The quantity of filter aid utilized for the whole filtration can be arrived at by multiplying the total volume filtered (in gl/ft²) by the rate of filter aid feed (in lb/gl); it will be, therefore, $103 \times 0.0105 = 1.08$ lb/ft², well below the 2.5 lb/ft² that would have been possible were it not for the premature drop in flow.

Point B represents overfeeding conditions; the filtration cycle will have to be terminated because the space for cake would have been prematurely filled. The total volume output will be found by dividing the total weight of filter aid allowed by the rate of filter aid feed, therefore, $2.5 : 0.0355 = 70.4$ gl/ft². The total resistance increase will be $2.1 \times 70.4 = 147.8$, corresponding still to a high flow rate but achieved at the expense of a shortened cycle.

Point C represents a conveniently balanced filtration corresponding to a practical specific cake resistance $r = r_f = 124$. The total volume throughput will be 135 gl/ft² with both limitations reached simultaneously ($135 \times 0.0186 = 2.5$ lb/ft² and $135 \times 2.305 = 310$ psi/gl/min/ft²).

In FIG. 3 I utilize the same graphic representation with reference to a different grade of diatomaceous earth, one of the lowest porosity grades designated by the manufacturer as J. M. 505. The typical permeability is claimed by the manufacturer to be 0.1 Darcy units. However, the characteristic cake specific resistance measured at viscosity conditions of 2 centipoises, was $r_{Lo} = 45$, corresponding to a permeability of 0.07 Darcy units.

The important aspect to be noted for the 505 curves is the fact that due to the very low porosity of this filter aid grade, the best filtration slope would not be $r_f = 124$ but rather $r_m = 139$. Actually, higher slopes, up to near 200, would be justified, because the load lines are nearly horizontal in that region.

Another condition wherein $r_m$ would be the preferred slope occurs with liquids of high viscosity. FIG. 5 shows what would happen if a liquid of a viscosity of 5 centipoises were filtered with T. M. Standard Supercel. In this case, due to the high viscosity, the $r_m$ slope would have a value of 147 and would be a more desirable operating slope than $r_f$.

As a rule of thumb, one may say that if $r_f > 4 r_{Lo}$, where $r_{Lo}$ is the characteristic specific resistance of the particular grade of filter aid to be used, measured in the viscosity conditions that are going to be prevalent during filtration, then the value $r_f$ should be the practical specific resistance to select. If, however, $r_f < 4 r_{Lo}$, it would be advisable to investigate, through laboratory tests similar to those described before, what value the slope $r_m$ would be; if greater than $r_f$, than $r_m$ would be the filtration slope to select.

In FIG. 4, I show the load lines shape for a very high porosity grade of filter aid. It is J. M. Hyflo Super-cel for which the manufacturer claims a porosity of 2 Darcy units. The value found for $r_{Lo}$ was 4.4 indicative of the very high porosity of this filter aid. Surprisingly, however, the shape of these curves showed an unexpected earlier and faster rise than for the other two grades, making it necessary to include a third power term ($L^3$) in the mathematical model equation. This is apparently due to migration of "fines" through the highly porous cake. These "fines" being caught in earlier layers of the cake reduce their porosity, progressively increase their tendency to retain migrating fine particles. Eventually, a layer forms where the resistance starts rising exponentially. This probably occurs at the cake interface with the precoat surface.

This is an illustration of a mismatch between the sediment solids size and the filter aid grade. The requirement of total entrapment of the sediment solids was therefore not met.

IN SUMMARY

When the most efficient filtration is to be the one achieving the maximum filtrate volume output, the best operating slope is selected by choosing the highest of two values:

1. the filter slope $r_f$, found by dividing the maximum cake resistance the filter delivery system can handle by the maximum filter aid weight the filter chamber can accommodate, or:

2. the filtration slope $r_m$, for which the cake resistance increase per volume of liquid filtered is minimum.

A comparison between the values $r_f$ and $r_{Lo}$ (where $r_{Lo}$ is the characteristic specific resistance of the particular filter aid to be used, measured in the total absence of sediment solids and at the same viscosity conditions as the actual filtration) permits a rapid selection of one of the two slopes. If $r_f$ is greater than $4 r_{Lo}$ then $r_f$ will be the best slope; if $4 r_{Lo}$ is greater than $r_f$ then $r_m$ should probably be greater than $r_f$ and therefore, a better slope. In this case, a determination of the value $r_m$ through appropriate laboratory filtration tests may be convenient.[1]

[1] FIG. 5 shows the result of a filtration with J. M. Standard Super cel at viscosity conditions equal to 5 centipoises as compared to 2 centipoises (FIG. 2). The value of $r_{Lo}$ increaed from 15 to 37.5 and $r_m$ became 147 instead of 58.9. Due to the high viscosity the best filtration slope is $r_m = 147$ since it is higher than $r_f = 124$.

It is conceivable that for some special separation processes, the measurement of efficiency may result from considerations other than the maximum liquid volume output. The case, for example, where the separated solids are the desired end product comes to mind; here, further costs incurred to recover the solids from the filter aid may be a factor to take into consideration.

In any event, if the problem of filtration efficiency measurement is formulated in such a manner as to establish an optimum value for the practical specific cake resistance, the present invention will provide a convenient and highly effective way of obtaining optimum efficiency. The system will achieve that by automatically keeping constant, through the whole filtration cycle, the selected "optimum" specific resistance.

Brief Description Of How The Control System Works

The way the control system of the present invention works, in order to keep constant the selected filtration slope r, can be easily understood by visualizing a cake filtration as consisting of the deposition of successive incremental layers formed by a weight ΔW of filter aid per unit of area, which is allowed to retain just enough sediment particles until the cake resistance, per unit of area, increases by ΔR.

At the start of filtration, the system perceives that the only filter aid particles available to retain sediment solids consists of a very thin layer, at the surface of the precoat, corresponding to a weight ΔW. When an increase of resistance ΔR is perceived, the filter aid feeder switches ON and delivers a new ΔW layer, whereupon it switches OFF. It waits again until a new increment ΔR occurs turning then ON once more. This process will repeat itself with a frequency that will be dependent on the sediment "load" of the in-feed. The length of time between successive ΔW deliveries is of no consequence to the control system. It may be, conceivably, a matter of hours, if the concentration of sediment in the in-feed is minimal; or a few seconds only, in the case of very heavy sediment. The $\Delta R$ and $\Delta W$ values are interrelated through a feedback control loop so as to keep the ratio $\Delta R/\Delta W$ constant and equal to $\bar{r}$. By making the value $\bar{r}$ equal to the optimum specific resistance the objective of efficiency optimization will be fully achieved.

BRIEF DESCRIPTION OF THE DRAWINGS

FIG. 1 shows an example of the calculation of the "practical specific cake resistance" from the results of a laboratory filtration test.

FIG. 2 shows the tabulated results of laboratory filtration tests, at different condition of solids load, for the grade of filter aid J.M. Standard Super-cel. From these results, a mathematical model equation was derived which permitted expression of the different factors affecting filtration efficiency by means of a convenient graphic representation consisting of a family of curves referred to as "load lines". For each diferent solids load level the value of the resistance increase rw, per each gallon per square foot filtered, is given as a function of the filter aid feed rate (w). This graphic representation provides a convenient illustration of the process for the selection of the most efficient filtration slope.

FIG. 10 is a graphic representation of all the control functions as they may be required during a filtration cycle.

FIG. 11 Is an analog embodiment of the linear ramp generator 62' in FIG. 8.

FIG. 12 is an example of an analog embodiment of the error calculator 82 (FIG. 8).

DETAILED DESCRIPTION OF THE PREFERRED EMBODIMENTS

Figure 3:
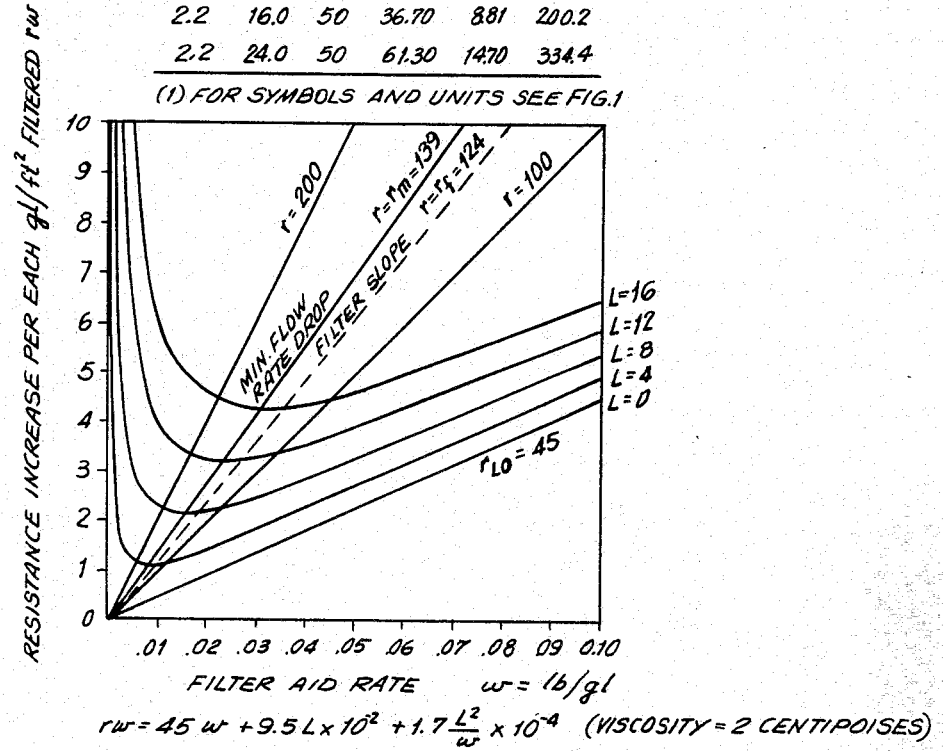
FIG. 3 is a corresponding illustration of the results obtained with J.M. Celite 505. It is an example of a filter aid grade of low porosity where, even at the low porosity condition of 2 centipoise, the slope ($r_m$) corresponding to the minimum flow rate drop was found to be slightly better than the filter slope ($r_f$).
Figure 4:
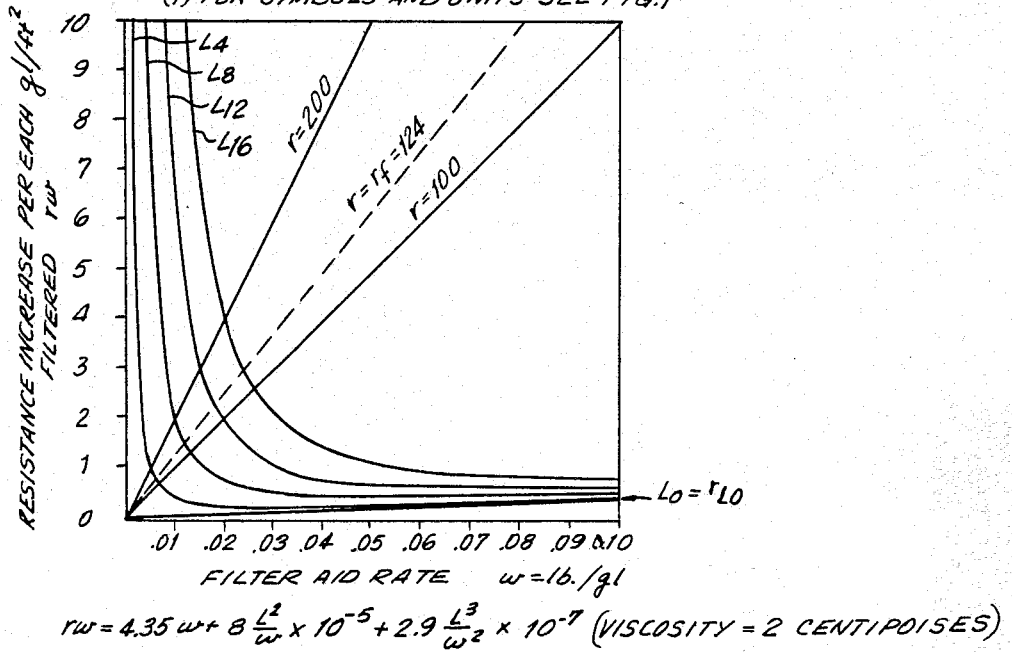
FIG. 4 is a corresponding example of a filter aid grade (J.M. Hyflo Super-cel) having an excessively high porosity for the particular sediment solids particle size distribution. The load lines cross the filter slope $r_f$ at an excessively steep angle.
Figure 5:
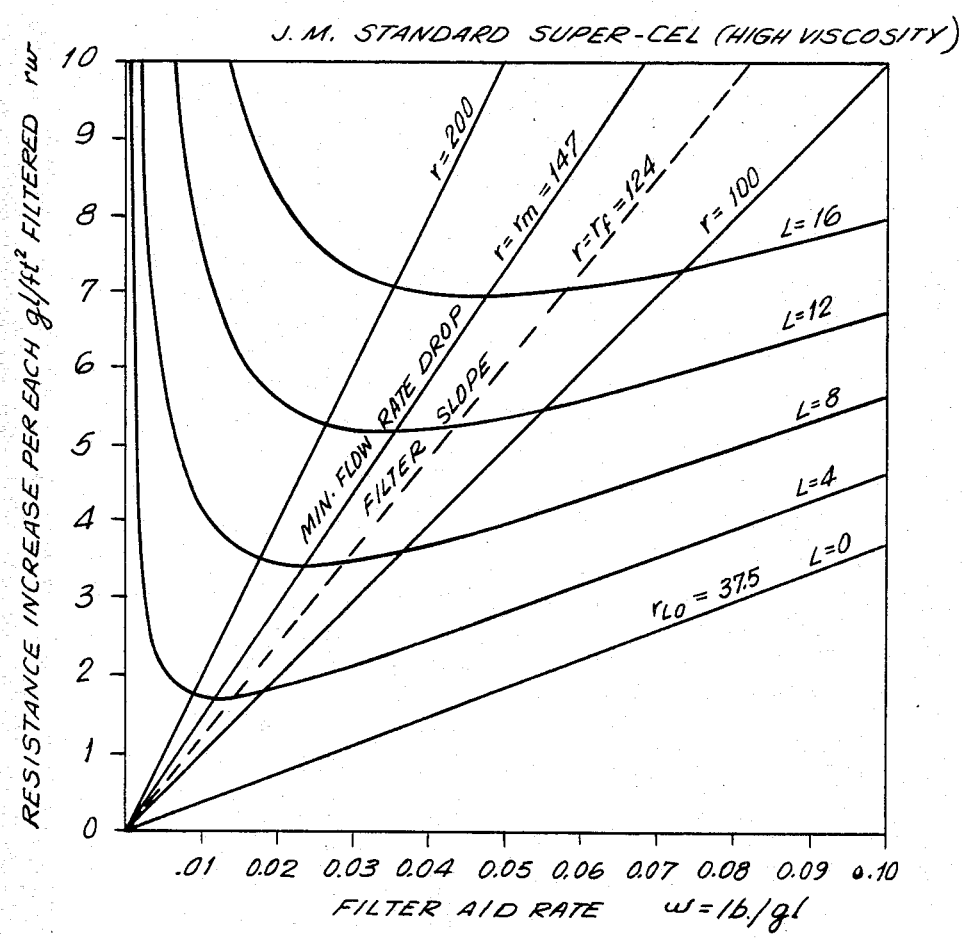
FIG. 5 is an illustration of a situation where the high viscosity of the liquid caused the filtration slope ($r_m$) to become a slightly better choice than ($r_f$).
Figure 6:
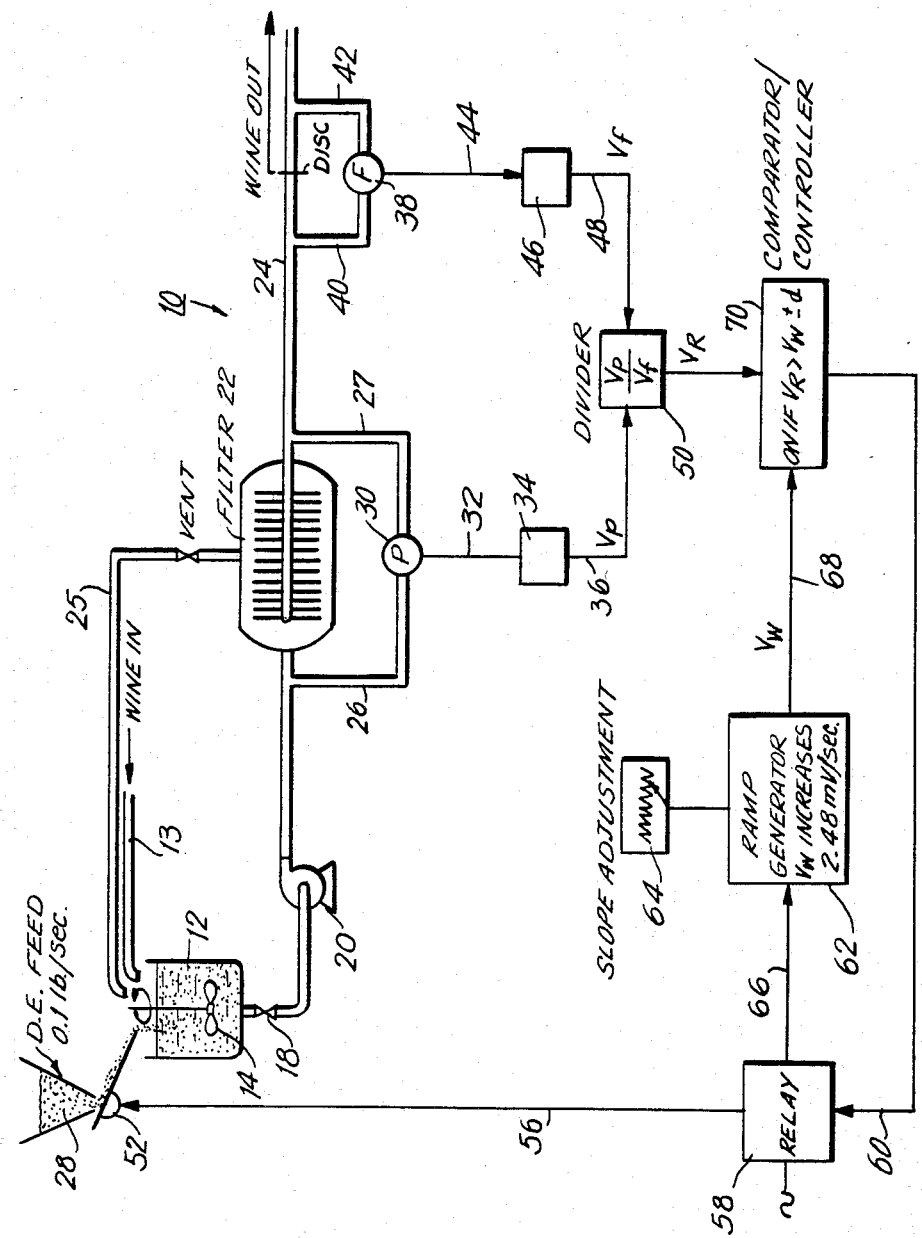
FIG. 6 represents a basic filtering system for use with a method embodying the present invention.

Referring now to FIG. 6, the reference numeral 10 denotes a basic filtering system for use with a method embodying the present invention.

In this system, a day tank 12, including a stirring paddle 14, receives the unfiltered liquid through an inlet conduit 13 from a storage tank (not shown). The liquid, e.g. wine, exits from the tank 12 through a control valve 18 and is led to a pump 20 which delivers it to a filter 22. In the system illustrated, the filter is a pressure leaf filter, this being mentioned by way of example. Any other type of filter using filter aid body feed alternatively may be employed. An outlet conduit 24 leads the filtered liquid from the filter to further processing or storage equipment (not shown). Optionally, a valved feedback venting conduit 25 runs from a high point of the filter to the day tank. A particulate feeding means 28 is utilized to deliver filter aid, e.g. diatomaceous earch, intermittently to the day tank. The feeder 28 is intermittently energized delivering about 0.1 lbs/second during energization. The diatomaceous earth is mixed with the influent liquid in the agitated day tank. The pump 20 in said exemplificative system, has a cutoff pressure of approximately 100 psig. The filter has a filtration area of 200 ft² in the system being described.

The control equipment is described as follows: a means 30 is provided for continuously measuring the differential pressure across the filter which is the difference between pressure prevailing at the inlet to the filter and at the outlet conduit 24. This may be any simple means such as, for instance, a closed container P having an inlet connected by a conduit 26 to the inlet to the filter and another inlet connected by a conduit 27 to the outlet conduit 24. The two inlets to the container are separated by a diaphragm (not shown) whose movement is responsive to the pressure difference between the inlet and outlet to the filter. The means 30 is physically connected as by a linkage 32 to a pressure transducer 34 which will convert pressure to an electrical characteristic, e.g. a voltage output $V_p$, which appears on an electric line 36.

Thus, the differential pressure means 30 constitutes a differential pressure sensor and associated transmitter which converts the pressure across the cake into the voltage output $V_p$.

A second sensor is provided; this constitutes a flow rate sensor 38 which may be a mechanically simple device such as a disc mounted in the outlet conduit 24 and having an orifice (not shown) so that a pressure drop will exist across the disc. The pressure drop is proportional to the rate of flow of wine through the disc in the outlet and hence, is a function of flow rate of the wine. This pressure drop must be continuously measured and converted into an electric characteristic, e.g. voltage. Such measurement and conversion is accomplished by tapping the outlet conduit 24 before and after the disc and connecting the same by means of sensor tubes 40,42 to the flow rate sensor 38 which, as in the case of the differential pressure sensor 30, may constitute a diaphragm in a closed container subjected on its opposite surfaces to the different pressures prevailing in the outlet conduit 24 on the upstream and downstream sides of the disc. Movement of the diaphragm in the flow rate sensor 38 is monitored by a linkage 44 which is connected to a flow rate transducer 46 that provides a voltage $V_f$ at its output electrical line 48 which is a function of the rate of flow of the liquid leaving the filter. It will be appreciated that the two sensors 30,38 continuously monitor the pressure drop across the filter cake and the flow rate of the pumped liquid passing through the cake.

As thus far illustrated and described, the system 10 is entirely conventional; that is to say, it is conventional, as observed above, to feed diatomaceous earth to the unfiltered liquid in an agitated day tank and then to pump it through a filter after which it is delivered to further processing equipment. It is also conventional to monitor the filter pressure drop and flow rate. The instant invention resides in the way these measured variables are used to provide a measurement of the cake resistance and from it to generate a control signal for the filter aid and delivery means.

The continuously monitored variables $V_p$ and $V_f$ are fed to an electrical voltage divider 50; the output of which is a voltage $V_R$ which is equal to $V_p/V_f$. This voltage $V_R$ is proportional to the filter cake resistance R since R, by definition, equals P/F. The response of the voltage divider 50 is adjusted to give a preselected value per unit resistance R. In the example being described, the adjustment provides 40 millivolts per resistance unit. For example, this adjustment will give an output of 400 millivolts for the initial filtration conditions at which $P_i$ divided by $F_i$ is 10, that is to say, $R_i$ is equal to 10. This will give a value of 12,800 millivolts for the ultimate resistance $R_u$ which, in the example being described, is 320.

A motor 52 when energized, actuates the vibratory feeder 28 for the particulate material, namely diatomaceous earch. Power is supplied to the motor from a line 56. Line 56 is connected to power through a relay 58. The relay is normally open, but when closed will turn on the motor 52. A second contact in the same relay will also simultaneously turn on an electronic ramp generator 62 through line 66. The relay 58 is controlled from a line 60. When the line 60 has a signal applied to it, the relay 58 will be changed from normally open to closed. When power is interrupted, the relay will open. The presence of a signal on the line 60 will cause the motor 52 to be actuated and diatomaceous earth to be fed into the day tank. Simultaneously the ramp generator voltage also will climb. In the absence of a signal, no diatomaceous earth is fed to the tank and no voltage increase will occur in the ramp generator 62.

The total weight of filter aid being accummulated in the filter cake is translated into a corresponding electrical characteristic, e.g. a voltage $V_W$ produced by the voltage ramp generator 62, the slope of which is adjustable by a control 64. In the example being described, the slope of the generator is set to 2.48 millivolts per second.

Since the same relay 58 turns on the filter aid feeder 28 and the ramp generator 62 simultaneously, the voltage output $V_W$ appearing on the line 68, increases at the rate of 24.8 millivolts for each pound of diatomaceous earch delivered by the feeder 28. The voltage $V_W$ and the voltage $V_R$ are fed to a comparator/controller 70 which compares the two voltages $V_R$ and $V_W$. The comparator/controller 70 is set in such a fashion that when $V_R$ exceeds $V_W$ by a small difference of d millivolts, i.e. if $V_R > V_W + d$ mV the comparator/controller will supply a signal to the line 60 to actuate and thereby close the relay 58 whereby to activate the feeder 28 and the ramp generator 62 simultaneously. On the basis of the foregoing representative values, the voltage $V_W$ will start to increase by 2.48 millivolts per second, corresponding to a feed of 0.1 lb/second of diatomaceous earch to the day tank. While this is happening, the cake resistance, as represented by the voltage $V_R$, constantly is being monitored as an absolute value which is not time related. When the comparator/controller determines that $V_W$ exceeds $V_R + d$, the comparator turns off the relay 58 by terminating the signal on the line 60; this will stop the delivery of diatomaceous earth to the day tank and will also terminate the rise in the ramp voltage. Thereupon, the unfiltered liquid continues to be fed through the filter, but without the addition of diatomaceous earth. The solids carried by the liquid will partially fill the voids of the recently formed layer of cake slowly increasing the resistance to flow until $V_R$ exceeds a new $V_W$ value by about d millivolts. At this point, the feeder 28 will be turned on once again and will stay on until $V_W$ raises about $2 \times d$ millivolts.

The cycle will be repeated again and again at successively higher ramp levels corresponding to successively higher total weight W of filter aid being accummulated in the cake. Because the comparator/controller turns off and on between values corresponding to $V_R-V_W=+d$ millivolds and $V_R-V_w=-d$ millivolts, the valud 2d, which represents the swing between the two conditions, is sometimes referred to hereinafter as "hysteresis". A visual representation of the relationship of this intermittent increase in total weight W of filter aid being accummulated in the cake, which is a function of the intermittent increase in voltage of the ramp generator 62 and to the substantially steady increase in the resistance R of the filter cake, both as a function of real time, will be found in the graph of FIG. 7. In this figure, the abscissa is real time. The ordinate is both: W, the total weight of filter aid being accumulated in the cake, and R the resistance to flow of the filter cake. It will be observed, that R progresses substantially steadily and that W advances intermittently, the advances starting and re-starting intermittently at intervals of 2d. It will be appreciated that the time intervals of actuating the filter aid feed varies as a function of the increase in resistance to flow R of the filter cake so that the intervals at which the filter aid is turned off and on could fluctuate quite appreciably with the amount of sedimentation (solids) in the unfiltered liquid. For a liquid with a high concentration of suspended solids, a typical cycle might be 20 seconds on and 30 seconds off and the total batch output 12,500 gallons. It will be understood, that this is only exemplificative and that the off/on time could vary quite substantially as would the total throughput for the batch.

By way of example, a reasonably clear liquid containing a low amount of suspended solids, could require a rate of filter aid addition on the order of 0.005 lbs/gallon. This would produce a cycle of about 20 seconds on and 240 seconds off and a total liquid throughput before the filter chamber is filled to capacity, of about 100 thousand gallons.

A liquid with a rather high level of suspended solids might produce a cycle of 20 seconds on and 60 seconds off with a total throughput of some 25 thousand gallons.

Figure 7:
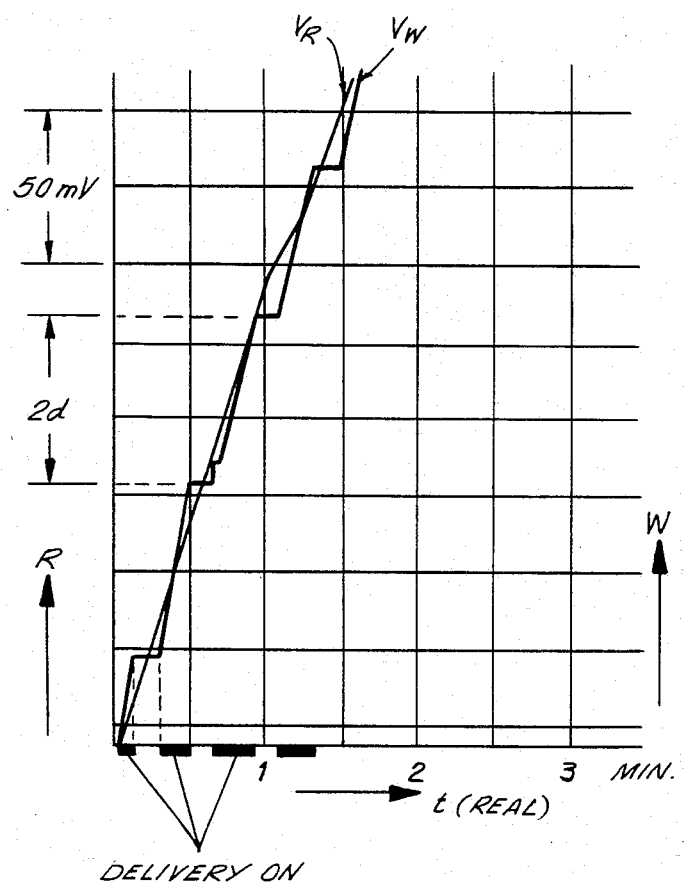
FIG. 7 is a highly enlarged view of a 2 minute recording of the voltages $V_R$ and $V_W$ as a function of filtration time. It shows how the system keeps the voltage $V_W$ substantially equal to $V_R$ by intermittently turning the delivery system ON and OFF.

FIG. 7 is a recording for 2 minutes of wine filtration, each horizontal block of the abscissa being one-half minute. The figure is a highly expanded recording of R and W as functions of time and represents rather heavily suspended solids contained in the liquid. The cycle illustrated represents about 25 seconds on and 24 seconds off.

The control mechanism described above provides a system which assures that throughout the total batch filtration cycle from precoating to filling of the filter container, the value of voltage corresponding to the total weight of filter aid $V_W$ is equal to $V_R \pm d$. Hence, if cake resistance R is plotted against pounds of filter aid delivered, a straight line will result with the same slope as the voltage accummulated in the ramp generator and equal to $\bar{r}$. The value of d can be adjusted by regulating the hysteresis, preferably between 25 and 50 millivolts, which will result in minimum additions of filter aid of about 1 to about 2 pounds each time that the comparator/controller 70 delivers a signal.

It is evident that, for the conditions described, when the ultimate resistance $V_{Ru}$ reaches 12,400 millivolts, the total weight of filter aid delivered will be 12,400 divdied by 24.8, or 500 pounds. Therefore, since the filtration area is 200 ft.$^2$, the total increase of filter cake resistance equal to 12,400 divided by 40, or 310, would be substantially uniformly spread over 2.5 lb/ft.$^2$ of filter cake corresponding in the given example to the desired average $\bar{r} = r_f$ of 124.

A different filtration slope, if desired or required, easily could be obtained by changing the slope of the ramp generator. For example, a value of dR/dW equal to 150 would be obtained by selecting a ramp slope of 3.01 millivolts per second.

It should be noted that in the simplified automatic system above described, it was assumed that the slope $r_{Lo}$ resulting from the addition of the pure filter aid was safely below the desired filtration slope. If this were not so, a positive feedback would result; the system would run into a continuous feed condition, trying the impossible task of attempting to increase the porosity of a pure filter aid cake be adding more of the same filter aid.

The automatic system described herein, can be considered as an "on/off" type of controller with a deadband or differential-gap or hysteresis equal to 2d mV; the measured variable R provides a changing set-point, and W is the operated or controlled variable.

The system as thus far described, represents the simplest embodiment of the present invention. Various parts and interactions which are not essential to the basic system have been omitted. However, certain refinements may be, and preferably are, employed and now will be described.

Figure 8:
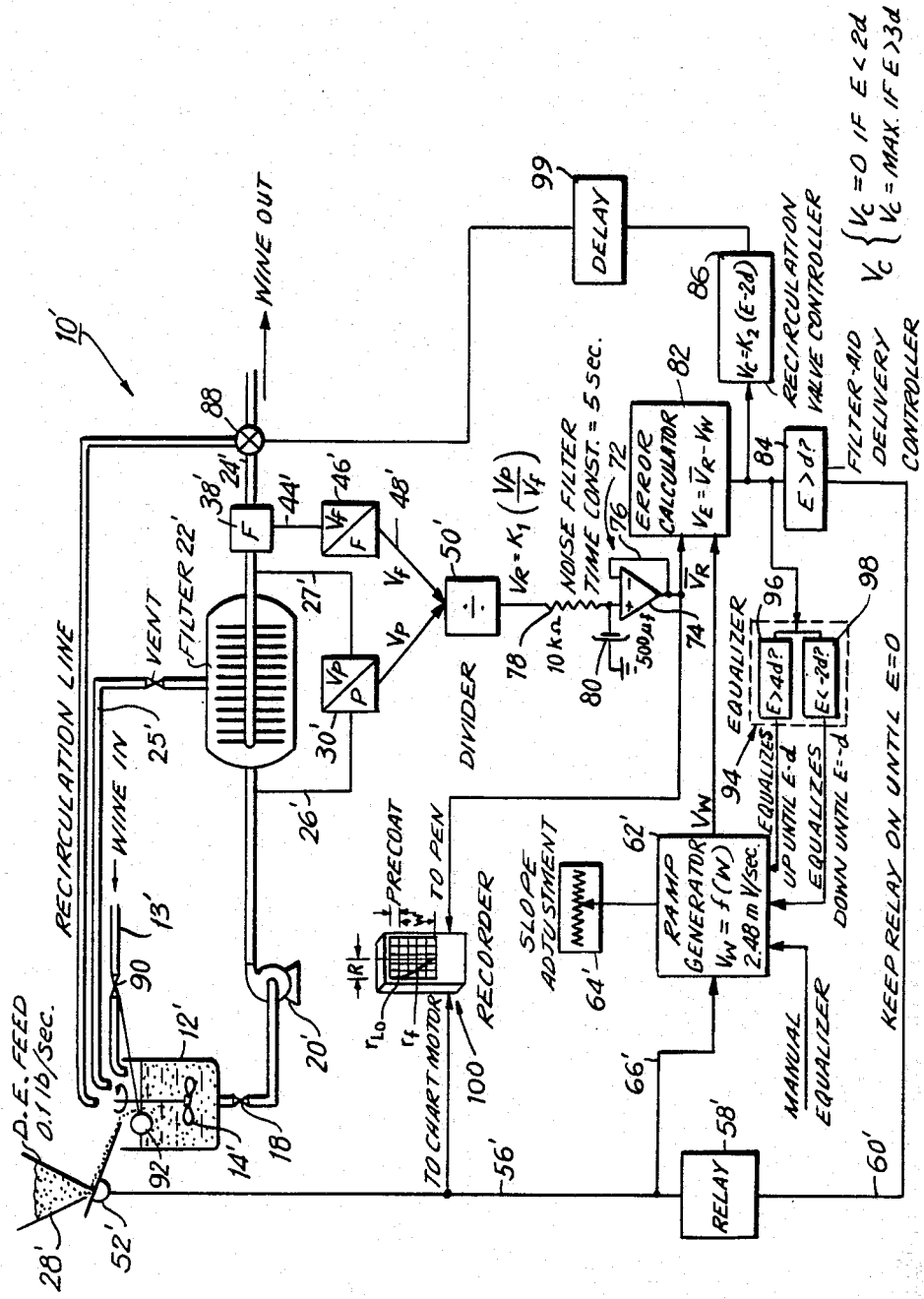
FIG. 8 shows a refined embodiment of a system in accordance with the present invention for adding filter aid material to a liquid to be filtered in such a manner as to produce a cake with a constant "practical specific resistance".

Referring to FIG. 8, which illustrates a refined system 10', the parts of the basic system which are identical to those of the first-described system 10, are denoted by the same reference numerals with primes added and will not be again described. The system 10' includes a noise filter 72 to smooth the signal $V_R$ and thus prevent erratic triggering of the comparator/controller by random noise. The noise filter has a high time constant of 5 seconds, for example, which is adequate considering the slow rate of change of $V_R$. Even at the maximum changing rate of 2.48 millivolts per second when the filter aid feeder 52' is continuously on, the lag between the filtered voltage $\bar{V}_R$ and the input voltage $V_R$ to the noise filter will only be 12.5 millivolts which is well within the hysteresis dead-band d of 50 millivolts. The noise filter is a typical standard noise filter which includes an operational amplifier 74 connected as a voltage follower through feedback connection 76. The amplifier has an input resistor 78 which, by way of example, is 10,000 ohms and is grounded at its delivery side through a capacitor 80 in the order of about 500 μf. The output from the noise filter is led to an error calculator 82 which determines the voltage error $V_E$ that is equal to $\bar{V}_R$ minus $V_W$. This voltage will be the input to three different circuits.

The first circuit to which the error calculator voltage is fed is the filter aid delivery controller 84 which should be the only one operating during the steady state periods of filtration as described above for the system 10. Up to sediment solids conditions for which the maximum rate of filter aid delivery (continuously on) can take care of, this filter will keep the error in $V_R$ between zero and +d millivolts. However, if the influent liquid contains excessive amounts of solids, the controller 84 will be unable to keep the error voltage from climbing. To rectify this condition, when $V_E$ enters a band between 2d and 3d millivolt, the error calculator output voltage is fed to a second circuit including a recirculation valve controller 86 which will operate as a proportional band controller feeding a modulating voltage to a motorized valve 88 in the outlet conduit 24'. The valve 88 is fully closed if E is smaller than 2d, but opens to divert a variable amount of wine from the outlet conduit to the day tank 12' as E exceeds 2d. When E reaches 3d, the valve 88 is fully open and no liquid flows to the discharge port. Since the recirculation of filtered liquid back into the day tank has the effect not only of diluting the solids content of the liquid in the day tank, but also of reducing the amount of influent liquid, the system will be brought under control once more. It is noted that there is a valve 90 in the influent wine conduit 13' which is controlled by a float 92 in the day tank so that reduction of level of wine in the day tank increases the in-flow of wine from the storage tank and, conversely, raising the level of wine in the day tank decreases the in-flow of wine from the storage tank.

The third circuit to which output voltage from the error calculator is fed includes an equalizer 94 which, like the filter aid delivery controller 84, is a voltage comparator. Actually, the equalizer includes two voltage comparators 96 and 98. The voltage comparator 96 sends a signal to the ramp generator when the voltage output from the error calculator is greater than 4d, and the voltage comparator 98 sends a signsal to the ramp generator 62' when the voltage signal from the error calculator 82 is less than −2d. The purpose and function of the equalizer 94 is to avoid faulty behavior of the system 10' when incidental distrubances of that system cause changes in $\bar{V}_R$ for reasons other than the normal resistance increase produced by build-up of the cake. These disturbances result from occasional necessary changes in the hydraulics of the system, examples of which are going into circulation, that is to say, going back to the day tank while changing lines to a different storage tank, or closing or opening of the vent line 25', etc. Such operations usually produce a change in $\bar{V}_R$ large enough to throw the error out of the operating band 2d in one or another direction. If the error rises above 4d millivolts, the equalizer comparator 96 will cause the ramp generator 62' to rapidly ramp up until the error is reduced to d millivolts. However, if the incidental disturbance causes the error to drop below the operating band, i.e. E is below −2d, the second equalizer comparator 98 will produce a fast ramp down until the error is reduced to about −d. Thus, the function of the equalizer 94 is to reduce the errors caused by this type of disturbance, i.e. non-random noise disturbance, without letting the errors be translated into filter aid delivery erros.

Disturbances of the nature just described, are prevented from actuating the circulation valve by a delay circuit 99 included between output of controller 86 and recirculation valve 88. This circuit disables the recirculation valve controller output 86 for a period of time long enough so that the equalizer 96 may reduce high positive E errors to a value safely below 2d.

The systems 10 and 10', as described above, are designed for a pressure leaf type filter or any filter where the filtration area can be considered to remain substantially constant throughout the full batch filtration cycle. There are, however, other types of filters in which the filtration area progressively varies through a full batch cycle. One such type is a tubular or candle filter in which the filter cake builds up over the surface of supports that have a cylindrical configuration. The filter cake which accumulates in such a filter takes on the same cylindrical shape and has a diameter that is constantly increasing as the filter cake builds up. Consequently, even if the practical specific filter cake resistance is kept constant, the increase in resistance of the total $\Delta R_T$ per increment of filter aid $\Delta W_T$ (the subscript T indicates that the increments refer to the total filter area as contrasted to the per square foot increments $\Delta R$ and $\Delta W$) will not be constant as they were in the case of systems employing filters having a constant filter area. This is so because the total filtration area for the different type filter, e.g. the cylindrical filter, will constantly increase; therefore, the value $(\Delta R_T)/(\Delta W_T)$ will constantly decrease.

Another refinement is a provision to take account of this constantly decreasing value where applicable. To deal with the problem, consider the ramp generator 62 or 62' as a programmer that will generate a curve that the $R_T$ is made to follow. In this manner, the desired and preselected effective specific resistance $\bar{r}$ which is equal to $\overline{dR/dW}$ can be obtained and maintained constant throughout the filter cake. For a constant area, this curve will be a straight line, as already observed, since $(dR_T)/(dW_T)$ will be constant and equal to $(\bar{r})/(A^2)$ inasmuch as $dR_T=(dR)/(A)$ and $dW_T=dW \times A$.

For a cylindrical filter, the "optimum" $(dR)/(dW)$ will be calculated as described for the pressure leaf filter since the same restraints apply which are: space limitation for cake build-up and maximum safe pressure for minimum practical flow. It is necessary to program $R_T$ as a function of $W_T$ so that the value $(dR)/(dW)$ will be kept constant. Taking into account solid geometry, it will be recognized that the volume V and the area A of the curved surface of a cylinder are related by the expression $$\frac{V}{A^2} = \frac{1}{4\pi L} = k_1 \tag{1}$$

where L is the height or length of the cylinder.

Since for a cake of constant effective specific resistance $$W_T = k_2 V \tag{2}$$

where $k_2$ is the filter aid cake density in lb/ft$^3$, and also $$\frac{dR_T}{dW_T} = \frac{\bar{r}}{A^2} \tag{3}$$

then from (1) and (2)

$$A^2 = \frac{W_T}{k_1 k_2}$$

so that:

$$\frac{dR_T}{dW_T} = \frac{k_1 k_2 \bar{r}}{W_T} \tag{4}$$

where $\overline{W}_T = W_T + W_{T_o}$ and $W_{T_o} = k_2 V_o$, and integrating between $W_{T_o}$ and $\overline{W}_T$ $$R_T = \phi(W_T) = k_1 k_2 \bar{r} \log(W_T + k_2 V_o) - k_1 k_2 \bar{r} \log k_2 V_o \tag{5}$$

where $k_1$ is a constant and equal to $(1)/(4\pi L)$, and $k_2$ equals pounds of filter aid per cubic foot of cake. For diatomaceous earths filter aids the value of $k_2$ varies from 18 for loose cakes to an average value of 23-24 at effective specific resistances of 100 to 200. $W_T$ is a total weight of filter aid delivered in pounds. $V_o$ is the initial volume of the cartridge in cubic feet. L equals N1, where N is the number of cartridges and 1 is the length of each cartridge in feet. The value $\bar{r}$ can be calculated from equation (5) for any specified cartridge filter by calculating the constants $k_1$ and $V_o$ from the filter geometry and replacing $R_T$ and $W_T$ respectively by the ultimate practical resistance value and the total pounds of filter aid allowed.

Figure 9:
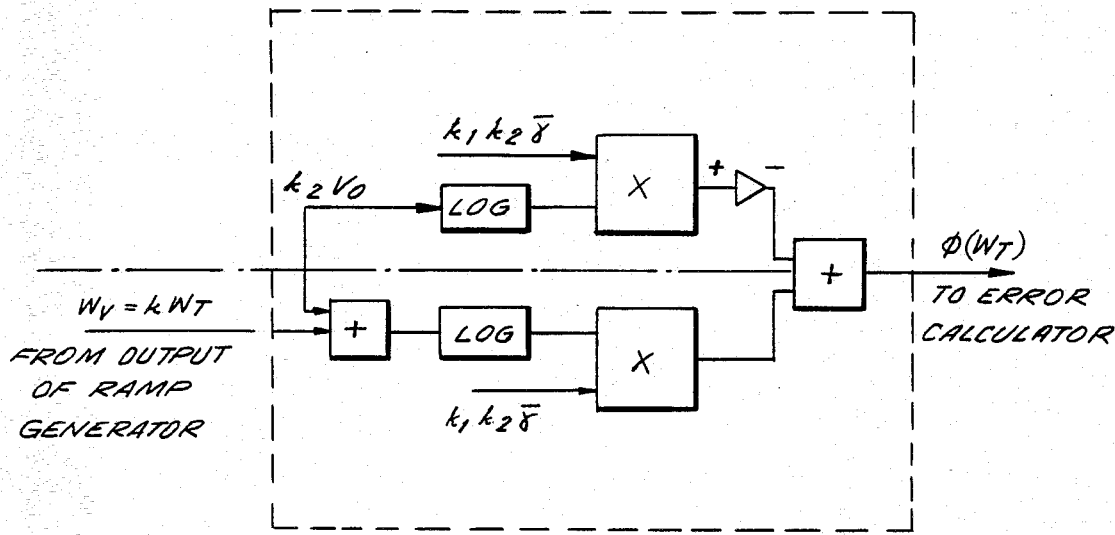
FIG. 9 is a schematic block diagram of an analog computer that converts the output of a linear ramp generator into a logarithmic function for use in tubular or cylindrical filters.

Modification of the system 10' for cylindrical filters would be accomplished by inserting between the output of the linear ramp generator 62' and the input of the error calculator 82 an analog circuit that will compute $\phi(W_T)$ as indicated in FIG. 9. The system as modified will work in the manner previously described.

In short, the way the system functions can be described as follows:

(a) it monitors the cake resistance by translating it into a voltage $V_R$.

(b) it converts the total weight of filter aid delivered from the beginning of filtration into a voltage $V_W$, representing what the cake resistance value should be if built always with a constant, predetermined specific resistance. This voltage $V_W$ will be a linear function of filter aid weight, for constant area filtration, or a logarithmic function for cartridge type filters. In a temperature programmed oven, as an analogous example; the temperature is made to follow a curve generated as a function of elapsed time. In the present system the resistance is made to follow a curve generated as a function of weight of filter aid delivered;

(c) it generates an error voltage $V_E = V_R - V_W$ that will be used to produce the control actions as shown in FIG. 10. The area identified by the letter a represents the formation of a "precoat"; this is achieved by: bypassing the control system and delivering a quantity of filter aid sufficient to form a thin cake layer, while circulating a clear liquid. Since this layer is formed without any entrapment of sediment solids, its specific resistance will be much lower than the preselected value; this will make $V_W$ rise faster than $V_R$ and $V_E$ will become negative. When the error voltage $V_E$ reaches the value $-2d$ corresponding to the low limit of the "fast ramp down band", the equalizer section of the control system will rapidly lower the voltage $V_W$ until the error is reduced to the upper limit $-d$ of this band. This will be repeated, as necessary, to avoid the voltage $V_E$ from wandering too far from the ON-OFF control band.

When filtration begins, at point $a_1$, the filter aid delivery will be put totally under system control (deliberate feed for precoat formation stopped).

As sediment solids collect at the surface of the precoat, $V_R$ will start increasing and $V_E$ will slowly rise from $-d$ towards the upper limit of the ON-OFF control band. When the value $+d$ is reached, at point $a_2$, the delivery will be switched ON and, consequently, $V_W$ will start rapidly increasing, producing a decrease in the error voltage $V_E$. When at point $a_3$, $V_E$ reaches the value $-d$, the system will switch OFF and the error voltage will start climbing once more as $V_R$ rises with further entrapment of sediment in the recently deposited layer. This ON-OFF cycle will repeat itself, usually with a progressive increase in the percentage of ON time due to the rise in sediment concentration as for example when the bottom of the supply tank is approached.

Area c of FIG. 10 represents an instance where $V_R$ climbs suddenly due to a reason other than the normal increase in cake resistance (disturbance of hydraulic nature, such as closing of a vent line). The equalizer section of the control system recognizes the sudden increase of $V_E$ away from the ON-OFF band as being caused by a disturbance and will cause a fast "ramp up" of the voltage $V_W$ until $V_E$ is brought again to the control band.

Area d of FIG. 10 illustrates how the automatic recirculation valve performs. At point $d_1$ the delivery system is turned ON but is unable to cancel the error; this causes the voltage $V_E$ to drift away from the ON-OFF band and eventually enter the proportional band at $d_3$. By diverting filtered liquid back to the receiving day tank, the system forces a valve, actuated by a float, to reduce the flow of the liquid containing sediment until the quantity of incoming solids conforms with the maximum rate of filter aid feed.

As is also apparent from the graph of FIG. 10, there is a steady increase in the percentage of ON time for delivery system. It goes from 20 to 30% at the beginning of filtration to over 50% after 3 hours. Eventually, as the bottom of the feeding tank is approached, it becomes not only continuous, but also requiring the reduction of the flow rate of the incoming unfiltered liquid through the action of the recirculation valve controller. Even in these extreme conditions, however, the trace of the recorder 100 in FIG. 8 will be a straight line. This is so because the chart motor being energized from line 56' the distance travelled by the paper will be a function of the weight of filter aid delivered W; on the other hand, the displacement of the pen will be a function of the voltage $\overline{V}_R$. Since the system keeps constant the ratio $\Delta R/\Delta W$ the pen will trace a straight line with a slope representative of the filtration slope selected.

There is another important role of the recorder 100 in FIG. 8; the line traced by the recorder during precoat will have the slope $r_{Lo}$ (provided a filtered liquid of the same viscosity as the one to be processed is used for precoating). It will, therefore, be simple to evaluate the correctness of the filtration slope selected, by verifying if it is higher than $4r_{Lo}$ as recommended before.

Figure 13:
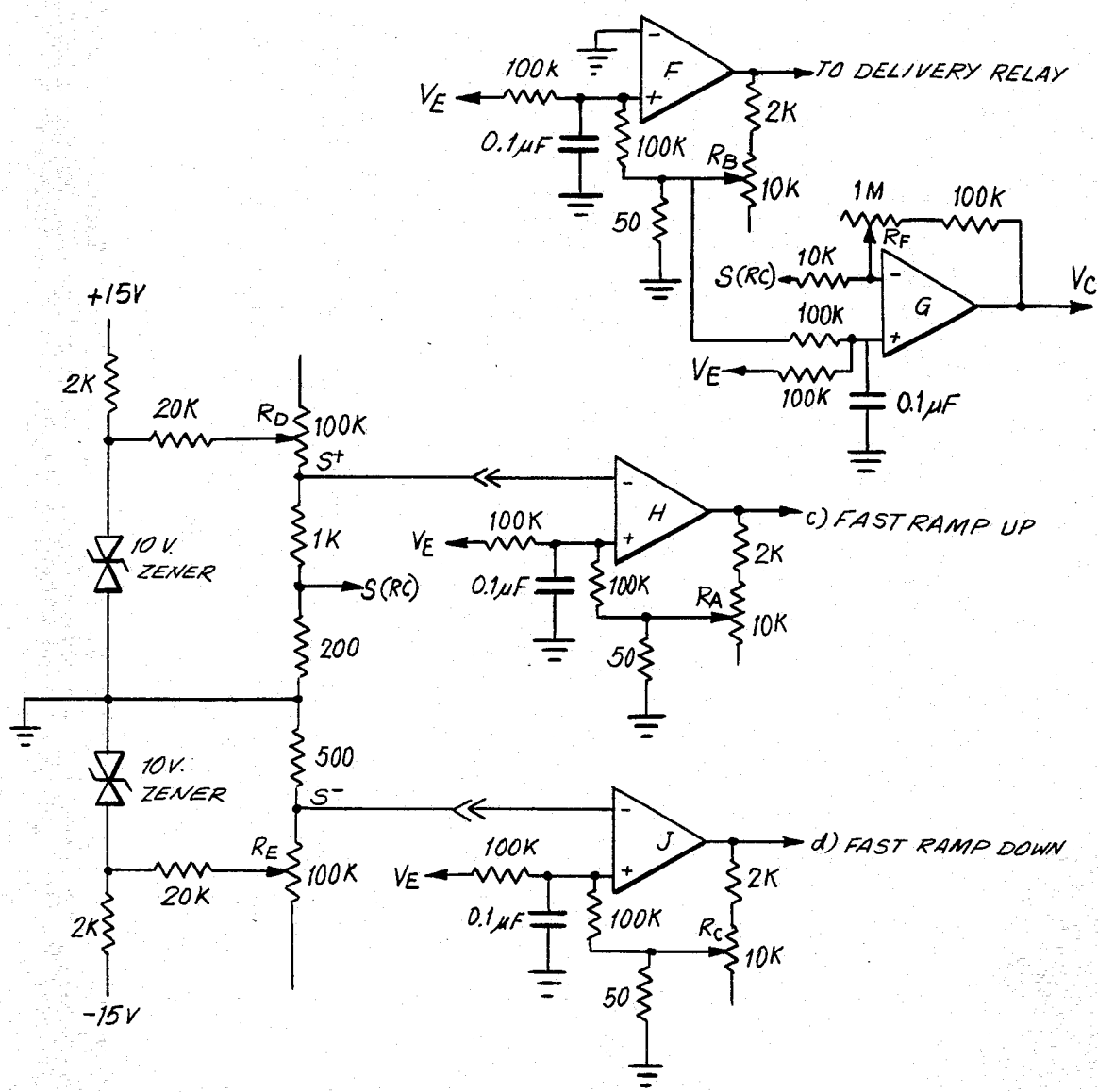
FIG. 13 is an example of an analog circuit designed to perform the four control functions of the automatic system described.

Exemplificative of electronic analog circuits performing the function described are presented in FIGS. 11, 12 and 13.

Referring to FIG. 11, operational amplifiers A and B each are one-half of a dual bifet operational amplifier integrated circuit such as an LF 353 N. The optoisolators OC1 to OC4 are of the phototransistor output type such as TIL 111. Operational amplifier A, optocoupler OC1 and their associated components constitute a constant current source that can be adjusted to deliver from 0.1 to 1 $\mu$A. This current will be allowed to charge the 1000 $\mu$F capacitor C, at a corresponding adjustable rate of 0.1 to 1 mV/sec. whenever OC2 is switched ON by a DC signal (a) derived from line 66' (FIG. 8). The optoisolators OC3 and OC4 act as solid state switches to perform the "equalizing" functions. When the output from equalizer 96 (FIG. 8) turns positive ($\simeq +12$ V.), OC3 is switched ON and a current of approximately 0.12 mA will flow through the 100 K$\Omega$ limiting resistor producing a rapid climb of the voltage $V_c$ until OC3 is again turned OFF. Identically, when the output from equalizer 98 (FIG. 8) goes low ($\simeq -12$ V), OC4 is switched ON and a current of approximately 0.12 mA will flow from capacitor C producing a rapid ramp down of the voltage $V_c$.

The operational amplifier B buffers and amplifies the voltage $V_c$ to convert it into the output voltage $V_W$.

The capacitor C is a good quality electrolytic capacitor, rated 35 volts but allowed to charge only between zero and one or two volts to minimize voltage drift caused by current leakage.

Optoisolators OC3 and OC4 are connected in a symmetrical opposing configuration to suppress voltage drift caused by quiescent currents.

Referring to FIG. 12, operational amplifier D calculates the difference $\overline{V}_R - V_W$. The output of D is smoothed by the 100 K$\Omega$ resistor and 0.1 $\mu$F capacitor and then amplified by operational amplifier E. The amplification factor can be adjusted from about 17 to 100. Increasing the amplification results in more frequent additions of smaller amounts of filter aid.

The output voltage $V_E$ is applied to the non-inverting inputs of the four operational amplifiers that produce the described four control bands (see FIG. 13).

Referring to FIG. 13, operational amplifiers F, H and J are connected as comparators with adjustable hysteresis depending on the voltage drop across the 50$\Omega$ resistors. The set point voltages for these comparators are provided by the circuit constituted by the two ZENER diodes and associated resistors. The voltage $S^+$ provides the set point defining the center of the upper equalizing band and is adjustable with potentiometer $R_D$. Ground voltage is the center of the delivery control band and $S^-$ is an adjustable set point (by means of $R_E$) centering the lower equalizing band. The widths of the equalizing and delivery control bands are also adjustable with potentiometers $R_A$, $R_C$ and $R_B$ that regulate the hysteresis of each respective comparator.

The voltage $S_{(RC)}$ defines the low limit of the recirculation valve modulating band. The output of operational amplifier G provides the modulating control voltage.

The output of comparator F operates the relay 58' through line 60' (FIG. 8).

The outputs of H and J operate the solid state switches OC3 and OC4 producing the appropriate equalizing actions [(c) and (d) of FIG. 11].

Each of A, B, C and D are one-quarter of a quad operational amplifier integrated circuit such as LM324.

Although the system described uses an intermittent dry delivery of the filter aid (body feed), it should be understood that in an alternate system the filter aid is added as a slurry which usually is injected with a positive displacement pump into the inlet conduit 26 or 26'.

The system of the present invention easily can be adjusted to a control system using a slurry rather than a dry feed by providing a means to translate the volume of slurry injected into the equivalent pounds of dry filter aid delivered.

The ON/Off operating band of the filter aid delivery controller can easily be converted into a modulating band that will be more suited for slurry delivery type systems. The slurry feed would conveniently modulate from completely off when the error would be less than $-d$ to maximum rate of delivery when the error increases to value equal or greater than $+d$.

It thus will be seen that there are provided methods and apparatuses which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. In a process comprising the separation of suspended solids from a liquid where the solids are retained by being entrapped in the porous structure of a filtration cake formed by particles of a filter aid material fed to the liquid upstream of the filtration cake, a control method wherein:
    (a) the filter aid feed is regulated in successive incremental steps in a manner such that successive incremental layers of cake produced maintain a practical specific cake resistance $r^*$ at a pre-selected value even if the concentration of solids suspended in the liquid varies with time,
        (i) the specific cake resistance $r^*$ being the ratio $\Delta R/\Delta W$ where $\Delta W$ is a small increment of filter aid weight fed to build up an incremental layer, and
        (ii) a predetermined increase in cake resistance to flow attained upon the addition of an incremental layer of filter aid feed corresponding to that increment $\Delta W$ and which has solids entrapped therein just sufficient to result in the said resistance increase $\Delta R$,
        (iii) both increments being expressed on a per unit of filtration area, and
        (iv) where the resistance to flow $R$ is the quotient of the differential pressure $P$ across the cake divided by the flow rate per unit of filtration area $F$.

2. A method as set forth in claim 1, wherein a programming control system is employed where a measured variable $R_T$, representing the resistance to liquid flow through the whole cake area, is forced to follow a programmed variable $R_W$, generated as a function of the accumulated weight $W_T$ of filter aid delivered to form a cake; and wherein the function generating $R_W$ is such, if $R_T$ is kept equal to $R_W$ within a small error of $+d$, that during the whole process, the practical specific cake resistance will be kept virtually constant at the preselected value $r$.

3. A method according to claim 2, wherein for processes where the most efficient separation is the one resulting in the maximum liquid volume output, the best practical specific cake resistance $\bar{r}$, also called "filtration slope" is selected by choosing the highest of two values:
    (a) the filtration slope $r_f$, calculated from the physical restraints of the particular filter installation utilized by dividing the maximum cake resistance the pump delivery system can adequately handle by the maximum filter aid weight the filter chamber can safely accommodate, and
    (b) the filtration slope $r_m$ for which the cake resistance increase per volume of liquid filtered is a miminum determined by laboratory filtration tests.

4. A method according to claim 3, wherein the value $r_m$ is estimated as being equal to $4r_{Lo}$; wherein $r_{Lo}$ is the characteristic specific resistance of the particular filter aid used, measured in the absence of sediment solids and at the same viscosity conditions as the actual filtration.

5. A method according to claim 2, wherein for a separation process where the cake formed has a constant surface area, the function generating the value $R_W$ is the straight line $$\phi(W_T) = \frac{\bar{r}}{A^2} W_T$$

where $W_T$ is the total weight of filter aid, $A$ is the filtration area and $\bar{r}$ the preselected specific resistance.

6. A method as set forth in claim 2, wherein for a separation process where the cake formed has a cylindrical shape with an increasing surface area throughout the cycle, the function $\phi(W_T)$ generating the variable $R_W$ is such that $R_W = \phi(W_T) = k_1 k_2 \bar{r} \log (W_T + k_2 V_o) - k_1 k_2 \bar{r} \log K_2 V_o$, where $W_T$ is the increasing accumulated weight of filter aid, $k_1$ is a constant and equal to $(1)/4\pi L)$ where $L$ is the cylinder length, $k_2$ is the weight of filter aid per unit of volume of cake, $V_o$ is the initial cylindrical volume defined by the precoat surface and $\bar{r}$ is the desired specific cake resistance.

7. A method as set forth in claim 2, wherein a ramp generator and associated electronic circuits are programmed to continuously express the accumulated weight of filter aid fed as a corresponding voltage $V_W$ representing what the cake resistance should be if constantly formed with the preselected specific resistance $\bar{r}$; wherein the differential pressure across the cake is converted into a corresponding voltage $V_P$, the rate of liquid flow through the cake is converted into a corresponding voltage $V_F$ and the cake resistance is conveniently represented by a corresponding voltage $V_R$ generated by dividing $V_P$ by $V_F$; wherein the voltage $V_R$ is compared with $V_W$ and an error voltage $V_E$ is produced such that $V_E$ equals $V_R$ minus $V_W$; and wherein the filter aid feed is regulated by a feedback control loop such that the error signal $V_E$ is kept within a very small control band limited by the values $-d$ and $+d$ where d is a small value so that resulting variations from the specific resistance $\bar{r}$ will be insignificant.

8. A method according to claim 7 wherein the control action is obtained by an on-off control system, with a hysteresis equal to 2d, in which the filter aid delivery is:
    (a) energized when the increase in $V_R$ due to sediment solids retention at the cake surface causes the error voltage $V_E$ to reach the upper limit $+d$, and
    (b) de-energized when, due to the conversion of the filter-aid weight being delivered into the corresponding voltage $V_W$ according with the function $V_W = \phi(W_T)$, the resulting faster increase of $V_W$ causes the error voltage $V_E$ to drop to the low limit $-d$.

be repeated, as necessary, to avoid the voltage $V_E$ from wandering too far from the ON-OFF control band.

When filtration begins, at point $a_1$, the filter aid delivery will be put totally under system control (deliberate feed for precoat formation stopped).

As sediment solids collect at the surface of the precoat, $V_R$ will start increasing and $V_E$ will slowly rise from $-d$ towards the upper limit of the ON-OFF control band. When the value $+d$ is reached, at point $a_2$, the delivery will be switched ON and, consequently, $V_W$ will start rapidly increasing, producing a decrease in the error voltage $V_E$. When at point $a_3$, $V_E$ reaches the value $-d$, the system will switch OFF and the error voltage will start climbing once more as $V_R$ rises with further entrapment of sediment in the recently deposited layer. This ON-OFF cycle will repeat itself, usually with a progressive increase in the percentage of ON time due to the rise in sediment concentration as for example when the bottom of the supply tank is approached.

Area c of FIG. 10 represents an instance where $V_R$ climbs suddenly due to a reason other than the normal increase in cake resistance (disturbance of hydraulic nature, such as closing of a vent line). The equalizer section of the control system recognizes the sudden increase of $V_E$ away from the ON-OFF band as being caused by a disturbance and will cause a fast "ramp up" of the voltage $V_W$ until $V_E$ is brought again to the control band.

Area d of FIG. 10 illustrates how the automatic recirculation valve performs. At point $d_1$ the delivery system is turned ON but is unable to cancel the error; this causes the voltage $V_E$ to drift away from the ON-OFF band and eventually enter the proportional band at $d_3$. By diverting filtered liquid back to the receiving day tank, the system forces a valve, actuated by a float, to reduce the flow of the liquid containing sediment until the quantity of incoming solids conforms with the maximum rate of filter aid feed.

As is also apparent from the graph of FIG. 10, there is a steady increase in the percentage of ON time for delivery system. It goes from 20 to 30% at the beginning of filtration to over 50% after 3 hours. Eventually, as the bottom of the feeding tank is approached, it becomes not only continuous, but also requiring the reduction of the flow rate of the incoming unfiltered liquid through the action of the recirculation valve controller. Even in these extreme conditions, however, the trace of the recorder 100 in FIG. 8 will be a straight line. This is so because the chart motor being energized from line 56' the distance travelled by the paper will be a function of the weight of filter aid delivered W; on the other hand, the displacement of the pen will be a function of the voltage $\overline{V}_R$. Since the system keeps constant the ratio $\Delta R/\Delta W$ the pen will trace a straight line with a slope representative of the filtration slope selected.

There is another important role of the recorder 100 in FIG. 8; the line traced by the recorder during precoat will have the slope $r_{Lo}$ (provided a filtered liquid of the same viscosity as the one to be processed is used for precoating). It will, therefore, be simple to evaluate the correctness of the filtration slope selected, by verifying if it is higher than $4r_{Lo}$ as recommended before.

Exemplificative of electronic analog circuits performing the function described are presented in FIGS. 11, 12 and 13.

Referring to FIG. 11, operational amplifiers A and B each are one-half of a dual bifet operational amplifier integrated circuit such as an LF 353 N. The optoisolators OC1 to OC4 are of the phototransistor output type such as TIL 111. Operational amplifier A, optocoupler OC1 and their associated components constitute a constant current source that can be adjusted to deliver from 0.1 to 1 $\mu$A. This current will be allowed to charge the 1000 $\mu$F capacitor C, at a corresponding adjustable rate of 0.1 to 1 mV/sec. whenever OC2 is switched ON by a DC signal (a) derived from line 66' (FIG. 8). The optoisolators OC3 and OC4 act as solid state switches to perform the "equalizing" functions. When the output from equalizer 96 (FIG. 8) turns positive ($\simeq +12$ V.), OC3 is switched ON and a current of approximately 0.12 mA will flow through the 100 K$\Omega$ limiting resistor producing a rapid climb of the voltage $V_c$ until OC3 is again turned OFF. Identically, when the output from equalizer 98 (FIG. 8) goes low ($\simeq -12$ V), OC4 is switched ON and a current of approximately 0.12 mA will flow from capacitor C producing a rapid ramp down of the voltage $V_c$.

The operational amplifier B buffers and amplifies the voltage $V_c$ to convert it into the output voltage $V_W$.

The capacitor C is a good quality electrolytic capacitor, rated 35 volts but allowed to charge only between zero and one or two volts to minimize voltage drift caused by current leakage.

Optoisolators OC3 and OC4 are connected in a symmetrical opposing configuration to suppress voltage drift caused by quiescent currents.

Referring to FIG. 12, operational amplifier D calculates the difference $\overline{V}_R - V_W$. The output of D is smoothed by the 100 K$\Omega$ resistor and 0.1 $\mu$F capacitor and then amplified by operational amplifier E. The amplification factor can be adjusted from about 17 to 100. Increasing the amplification results in more frequent additions of smaller amounts of filter aid.

The output voltage $V_E$ is applied to the non-inverting inputs of the four operational amplifiers that produce the described four control bands (see FIG. 13).

Referring to FIG. 13, operational amplifiers F, H and J are connected as comparators with adjustable hysteresis depending on the voltage drop across the 50$\Omega$ resistors. The set point voltages for these comparators are provided by the circuit constituted by the two ZENER diodes and associated resistors. The voltage $S^+$ provides the set point defining the center of the upper equalizing band and is adjustable with potentiometer $R_D$. Ground voltage is the center of the delivery control band and $S^-$ is an adjustable set point (by means of $R_E$) centering the lower equalizing band. The widths of the equalizing and delivery control bands are also adjustable with potentiometers $R_A$, $R_C$ and $R_B$ that regulate the hysteresis of each respective comparator.

The voltage $S_{(RC)}$ defines the low limit of the recirculation valve modulating band. The output of operational amplifier G provides the modulating control voltage.

The output of comparator F operates the relay 58' through line 60' (FIG. 8).

The outputs of H and J operate the solid state switches OC3 and OC4 producing the appropriate equalizing actions [(c) and (d) of FIG. 11].

Each of A,B,C and D are one-quarter of a quad operational amplifier integrated circuit such as LM324.

Although the system described uses an intermittent dry delivery of the filter aid (body feed), it should be understood that in an alternate system the filter aid is added as a slurry which usually is injected with a positive displacement pump into the inlet conduit 26 or 26'.

9. A method according to claim 7, wherein the controlling action is achieved through a modulating control in which an error voltage $V_E$ produces a modulating signal regulating the filter aid rate of dosage from zero when $V_E$ equals $-d$ to one hundred percent when $V_E$ equals $+d$.

10. A method according to claim 7, wherein random noise is damped out from the voltage $V_r$ by a resistance/capacitor filter with a time constant of a few seconds, low enough to make the control response virtually instantaneous, thus allowing the system to react to sudden variations in the sediment solids load of incoming liquid.

11. A method according to claim 7, wherein incidental hydraulic changes during the process, falsely causing the error voltage $V_E$ to suddenly move significantly above the operating band upper limit, are prevented from being translated in an appreciable delivery error; wherein this control function is achieved through an equalizer having an on-off control band with an upper limit equal to $+4d$ and a low limit equal to $+d$; and wherein the equalizer causes a rapid increase of the voltage $V_W$ whenever the error voltage $V_E$ reaches the value $+4d$ until the error is reduced to $+d$.

12. A method according to claim 11, wherein similar hydraulic disturbances, but causing the error voltage $V_E$ to suddenly fall significantly below the low operating band limit, are equally prevented from producing filter aid delivery errors through the action of a second equalizer control band with a low limit equal to $-2d$ and a high limit equal to $-d$; wherein this second equalizer control band causes a rapid decrease of the voltage $V_W$ whenever the error voltage $V_E$ drops below $-2d$ until the error is reduced to $-d$.

13. A method according to claim 7, wherein for abnormally high concentration of sediment solids, the error voltage $V_E$ produces a modulating signal whenever it enters a modulating band with a low limit equal to $+2d$ and a high limit equal to $+3d$; wherein this signal controls a modulated recirculation valve that will slowly move from closed when $V_E \leq 2d$, to open when $V_E \geq 3d$; wherein this valve has an overall effect of reducing the flow rate of the incoming unprocessed liquid until the quantity of sediment solids becomes commensurate with the maximum rate of filter aid feed; wherein this equilibrium point is reached for a valve position corresponding to a value of the error voltage $V_E$ between $2d$ and $3d$; and wherein a time delay permits the system to ignore rapid crossings of the recirculation control band caused by disturbances of the type that activate the upper equalizer control band.

* * * * *